(12) United States Patent
Schmittdiel et al.

(10) Patent No.: US 11,933,373 B2
(45) Date of Patent: Mar. 19, 2024

(54) PIPE CLAMP, PIPE CLAMP DRIVER AND ANTI-BACKDRIVE MECHANISM

(71) Applicant: Black & Decker, Inc., New Britain, CT (US)

(72) Inventors: Mike Schmittdiel, Baltimore, MD (US); Patel Sandip, Rosedale, MD (US); Dylan Parker, Towson, MD (US); Michael Justis, Monument, CO (US); Dustin L. Demarr, Nottingham, MD (US); Kathleen Miller, New Britain, CT (US)

(73) Assignee: Black & Decker, Inc., New Britain, CT (US)

( * ) Notice: Subject to any disclaimer, the term of this patent is extended or adjusted under 35 U.S.C. 154(b) by 0 days.

(21) Appl. No.: 17/942,480

(22) Filed: Sep. 12, 2022

(65) Prior Publication Data
US 2023/0003264 A1    Jan. 5, 2023

Related U.S. Application Data

(63) Continuation of application No. PCT/US2021/022250, filed on Mar. 13, 2021.

(60) Provisional application No. 62/991,910, filed on Mar. 19, 2020, provisional application No. 62/989,246, filed on Mar. 13, 2020.

(51) Int. Cl.
| | | |
|---|---|---|
| *F16D 41/18* | (2006.01) |
| *B25C 1/00* | (2006.01) |
| *B25C 5/15* | (2006.01) |
| *B25C 1/06* | (2006.01) |
| *F16L 3/02* | (2006.01) |

(52) U.S. Cl.
CPC ............ *F16D 41/185* (2013.01); *B25C 1/001* (2013.01); *B25C 1/006* (2013.01); *B25C 5/15* (2013.01); *B25C 1/06* (2013.01); *F16L 3/02* (2013.01)

(58) Field of Classification Search
CPC ... F16D 41/185; F16D 2011/006; F16D 11/14
See application file for complete search history.

(56) References Cited

U.S. PATENT DOCUMENTS

| | | | |
|---|---|---|---|
| 4,428,261 A | 1/1984 | Takatsu et al. | |
| 4,945,678 A * | 8/1990 | Berner | ................. E05F 15/619 |
| | | | 192/56.56 |
| 5,027,679 A | 7/1991 | Kawashima et al. | |
| 5,511,715 A | 4/1996 | Crutcher et al. | |
| 8,181,836 B2 | 5/2012 | Shkolnikov et al. | |
| 10,173,310 B2 | 1/2019 | Wyler et al. | |
| 10,239,127 B2 | 3/2019 | Zhou | |
| 10,349,984 B2 | 7/2019 | Cahill | |
| 10,480,587 B2 * | 11/2019 | Knuth | ..................... F16D 11/14 |
| 2017/0361441 A1 | 12/2017 | Namouz | |

(Continued)

FOREIGN PATENT DOCUMENTS

| | | | | |
|---|---|---|---|---|
| DE | 19845018 C1 * | 12/1999 | ......... | B25B 23/0064 |
| EP | 0949046 B1 | 5/2004 | | |

*Primary Examiner* — Huan Le
(74) *Attorney, Agent, or Firm* — Rhonda Barton

(57) ABSTRACT

A power tool including a housing and a motor housed in the housing. There is a spring engine housed in the housing and a driver blade driven by the spring engine. Additionally, the power tool holds a pipe clamp configured to be driven into a workpiece by the driver blade.

8 Claims, 37 Drawing Sheets

(56) References Cited

U.S. PATENT DOCUMENTS

2019/0091845 A1  3/2019  Wyler et al.
2019/0336180 A1  11/2019  Cahill

* cited by examiner

PIPE CLAMP, PIPE CLAMP DRIVER AND ANTI-BACKDRIVE MECHANISM

CROSS-REFERENCE TO RELATED APPLICATIONS

The present application is a Continuation of PCT/US2021/022250 filed Mar. 13, 2021, which claims priority to U.S. provisional patent application Ser. No. 62/989,246 entitled "Pipe Clamp, Pipe Clamp Driver and Anti-Backdrive Mechanism" filed Mar. 13, 2020, and U.S. provisional patent application Ser. No. 62/991,910 entitled "Pipe Clamp, Pipe Clamp Driver and Anti-Backdrive Mechanism" filed Mar. 19, 2020. The entirety of the above applications being incorporated herein by reference in their entirety.

BACKGROUND OF THE INVENTION

The present disclosure relates to pipe clamps, pipe clamp drivers and anti-backdrive mechanisms and combinations thereof.

SUMMARY OF EMBODIMENTS OF THE INVENTION

Aspects of the present disclosure relate to an exemplary embodiment of a power tool. The power tool including a housing; a motor housed in the housing; a spring engine housed in the housing; a driver blade driven by the spring engine; and a pipe clamp configured to be driven into a workpiece by the driver blade.

The driver blade may include a first projection and a second projection spaced apart from the first projection.

The pipe clamp may include a first nail and a second nail.

The first projection may contact the first nail and the second projection contacts the second nail to drive the pipe clamp.

The power tool may further include a battery pack to power the motor.

According to another aspect of the invention, there is an exemplary embodiment of a pipe clamp driver including a housing; a motor housed in the housing and driving a drive shaft; a wheel driven by the drive shaft; a carriage driven by the wheel; a spring drive, the spring drive comprising a spring; a driver blade operatively connected to the carriage and configured to drive a pipe clamp; wherein the carriage compresses the spring; and wherein the carriage is driven by the spring to drive the driver blade, whereby the driver blade drives the pipe clamp.

The driver blade may include a first projection and a second projection.

The first projection may be spaced apart from the second projection.

The first projection may be spaced apart from the second projection by at least twenty millimeters.

The first projection may be spaced apart from the second projection by at least thirty millimeters.

The pipe clamp may include a first nail and a second nail.

The driver blade may drive the pipe clamp, the first projection contacts the first nail and the second projection contacts the second nail.

According to another aspect of the invention, there is an exemplary embodiment of a pipe clamp including a pipe clamp body; a first nail; and a second nail spaced apart from the first nail.

The second nail may be spaced apart from the first nail by at least 15 millimeters.

The second nail may be spaced apart from the first nail by at least 20 millimeters.

The second nail may be spaced apart from the first nail by at least 30 millimeters.

The pipe clamp may further include a first arm and a second, the first arm and the second arm being rotatable relative to the pipe clamp body.

The first arm may be substantially straight.

The first arm may include a curved portion.

The first arm may include a rib.

An end of the first arm and an end of the second arm may be connected by a break-away portion.

The pipe clamp body may further include a first holding portion for the first nail.

The pipe clamp body may further include a second holding portion for the second nail.

According to another aspect of the invention, there is an exemplary embodiment of a pipe clamp, including a pipe clamp body; a first arm rotatable with respect to the pipe clamp body; a second arm rotatable with respect to the pipe clamp body; a first holding portion in the pipe clamp body; a second holding portion in the pipe clamp body; a first nail held in the first holding portion; a second nail spaced apart from the first nail and held in the second holding portion.

The first arm may be substantially straight.

The second arm may be substantially straight.

The first arm may have a curved portion.

The second arm may have a curved portion.

The second nail may be spaced apart from the first nail by at least 20 millimeters.

The second nail may be spaced apart from the first nail by at least 30 millimeters.

The pipe clamp may further include a break-away portion connecting ends of the first arm and the second arm.

The pipe clamp may further include a rib formed on the first arm.

The pipe clamp may further include a rib formed on the second arm.

According to another aspect of the invention, there is an exemplary embodiment of an anti-backdrive system for a power tool, including a drive shaft; a holder; a locking member secured to the holder in a non-rotatable manner; and a drive wheel connected to the drive shaft; wherein the locking member is held between the holder and the drive wheel and is axially movable towards and away from the drive wheel.

The drive wheel may include at least one projecting pin.

The drive wheel may have a first lock.

The locking member may have a second lock.

The first lock and the second lock may cooperate to prevent backdrive of the drive wheel.

The first lock may be an indent.

The second lock may be a ramp.

The anti-backdrive system may further include a biasing member which biases the locking member towards the drive wheel.

The biasing member may be a spring.

The biasing member may be a wave spring.

According to another aspect of the invention, there is an exemplary embodiment of a pipe clamp driver, including a housing; a motor housed in the housing and driving a drive shaft; a drive wheel driven by the drive shaft; a holder; a locking member secured to the holder in a non-rotatable manner; a carriage driven by the wheel; a spring drive, the spring drive comprising a spring; a driver blade operatively connected to the carriage and configured to drive a pipe clamp; wherein the carriage compresses the spring; wherein the carriage is driven by the spring to drive the driver blade, whereby the driver blade drives the pipe clamp; wherein the drive wheel has a first lock; wherein the locking member has a second lock; and wherein the first lock and second lock cooperate to prevent backdrive of the drive wheel.

The locking member may be held between the holder and the drive wheel and is axially movable towards and away from the drive wheel.

The drive wheel may include at least one projecting pin.

The first lock may be an indent.

The second lock may be a ramp.

The pipe clamp driver may further include a biasing member which biases the locking member towards the drive wheel.

The biasing member may be a spring.

The biasing member may be a wave spring.

These and other aspects of various embodiments of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. In one embodiment of the invention, the structural components illustrated herein are drawn to scale. It is to be expressly understood, however, that the drawings are for the purpose of illustration and description only and are not intended as a definition of the limits of the invention. In addition, it should be appreciated that structural features shown or described in any one embodiment herein can be used in other embodiments as well. As used in the specification and in the claims, the singular form of "a", "an", and "the" include plural referents unless the context clearly dictates otherwise.

All closed-ended (e.g., between A and B) and open-ended (greater than C) ranges of values disclosed herein explicitly include all ranges that fall within or nest within such ranges. For example, a disclosed range of 1-10 is understood as also disclosing, among other ranged, 2-10, 1-9, 3-9, etc.

BRIEF DESCRIPTION OF THE DRAWINGS

For a better understanding of embodiments of the present invention as well as other objects and further features thereof, reference is made to the following description which is to be used in conjunction with the accompanying drawings, where.

DETAILED DESCRIPTION OF EXEMPLARY EMBODIMENTS OF THE INVENTION

Figure 1:
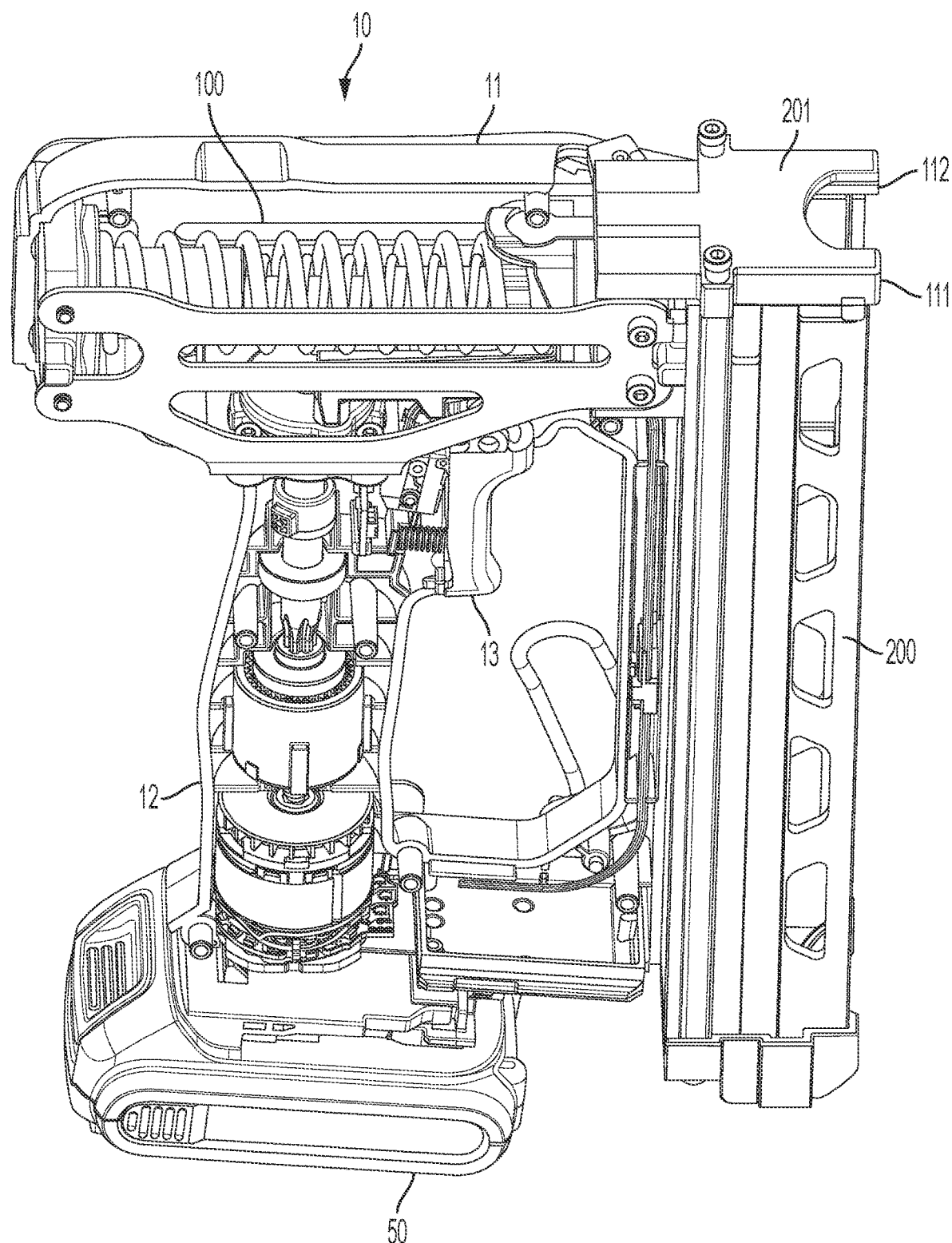
FIG. 1 is a perspective view of a pipe clamp driver according to an exemplary embodiment of the present application.
Figure 2:
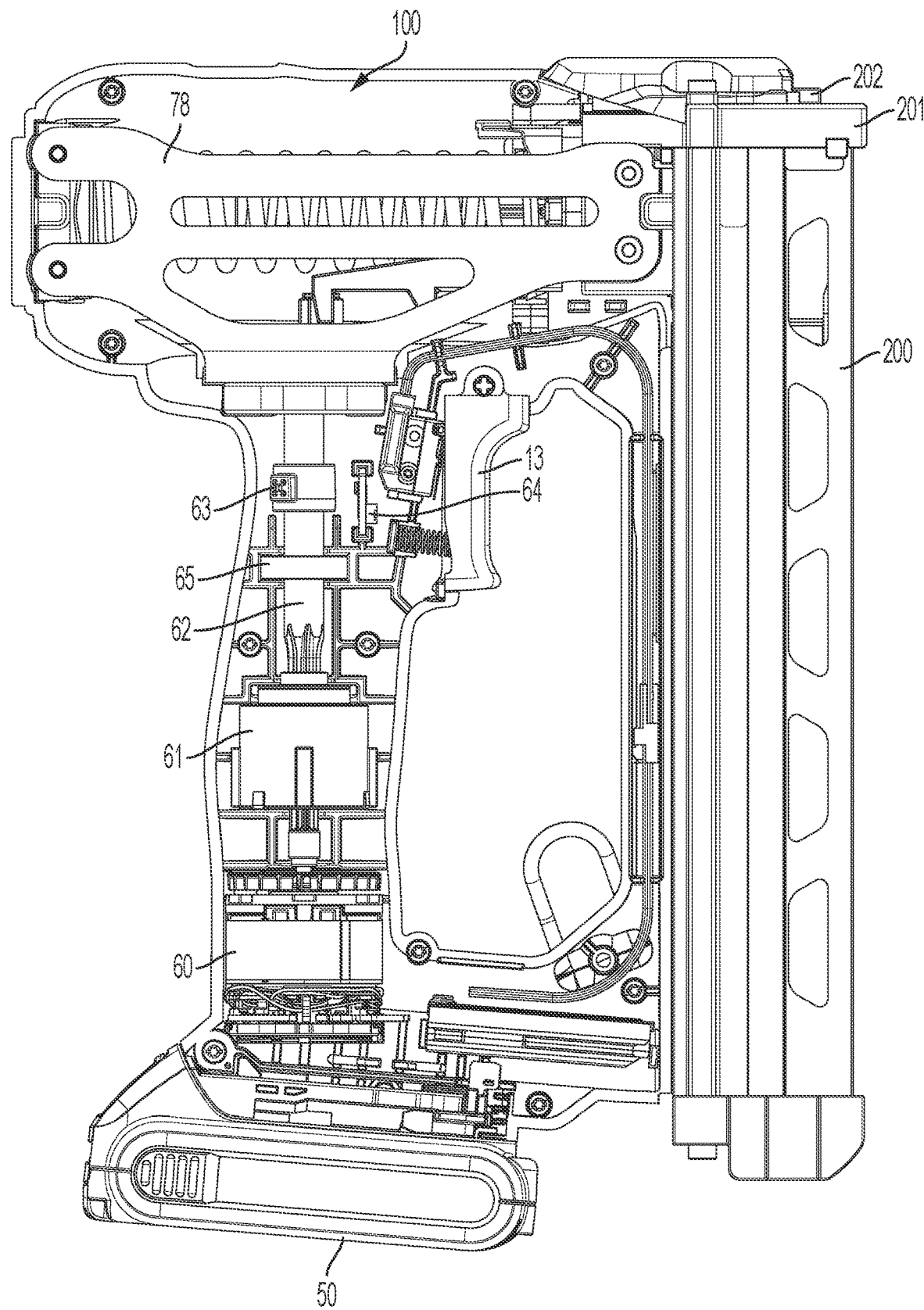
FIG. 2 is a side view of an exemplary embodiment a pipe clamp driver according to an exemplary embodiment of the present application.

FIGS. 1 and 2 illustrate an exemplary embodiment of a pipe clamp driver 10. As described below, the pipe clamp driver 10 of the exemplary embodiment is a powered tool configured to drive pipe clamps into work surfaces. FIG. 1 is a perspective view of the pipe clamp driver 10 with a portion of the housing 11 removed. FIG. 2 is a side view of the exemplary embodiment of the pipe clamp driver 10 with one side of the housing 11 removed to show internal features.

As shown in FIGS. 1 and 2, the pipe clamp driver 10 includes a handle 12. There is a user-actuatable trigger 13 on the handle. A removable and rechargeable power tool battery pack 50 powers the pipe clamp driver tool 10. The battery pack 50 may be of the type shown in, for example, U.S. Pat. Nos. 7,598,705; 7,661,486; or U.S. Patent Application Publication No. 2018/0331335. U.S. Pat. Nos. 7,598,705; 7,661,486; and U.S. Patent Application Publication No. 2018/0331335 are hereby incorporated by reference.

As further shown in FIGS. 1 and 2, the pipe clamp driver includes a motor 60. The motor 60 of the exemplary embodiment is a brushless motor, but a brushed motor or other motors may be used. The motor 60 drives a transmission 61. The transmission 61 in turn is connected to a drive shaft 62. There is a home position magnet 63 on the drive shaft 62 and a home position sensor 64 adjacent to the home position magnet. The drive shaft 62 is supported by a ball bearing 65. There may be various other ball or other bearings in the pipe clamp driver 10.

Figure 3:
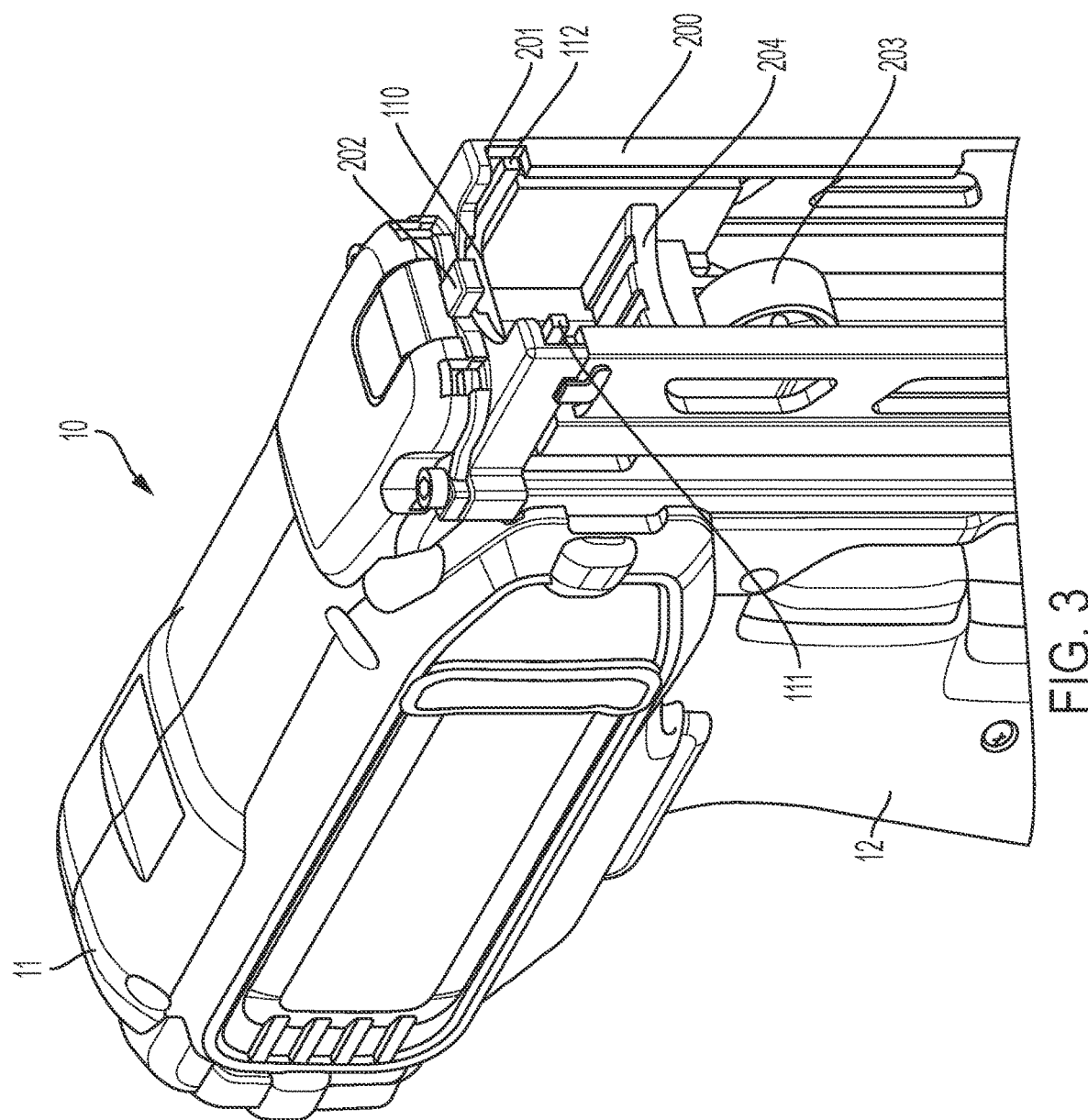
FIG. 3 is another perspective view of a pipe clamp driver according to an exemplary embodiment of the present application.
Figure 19:
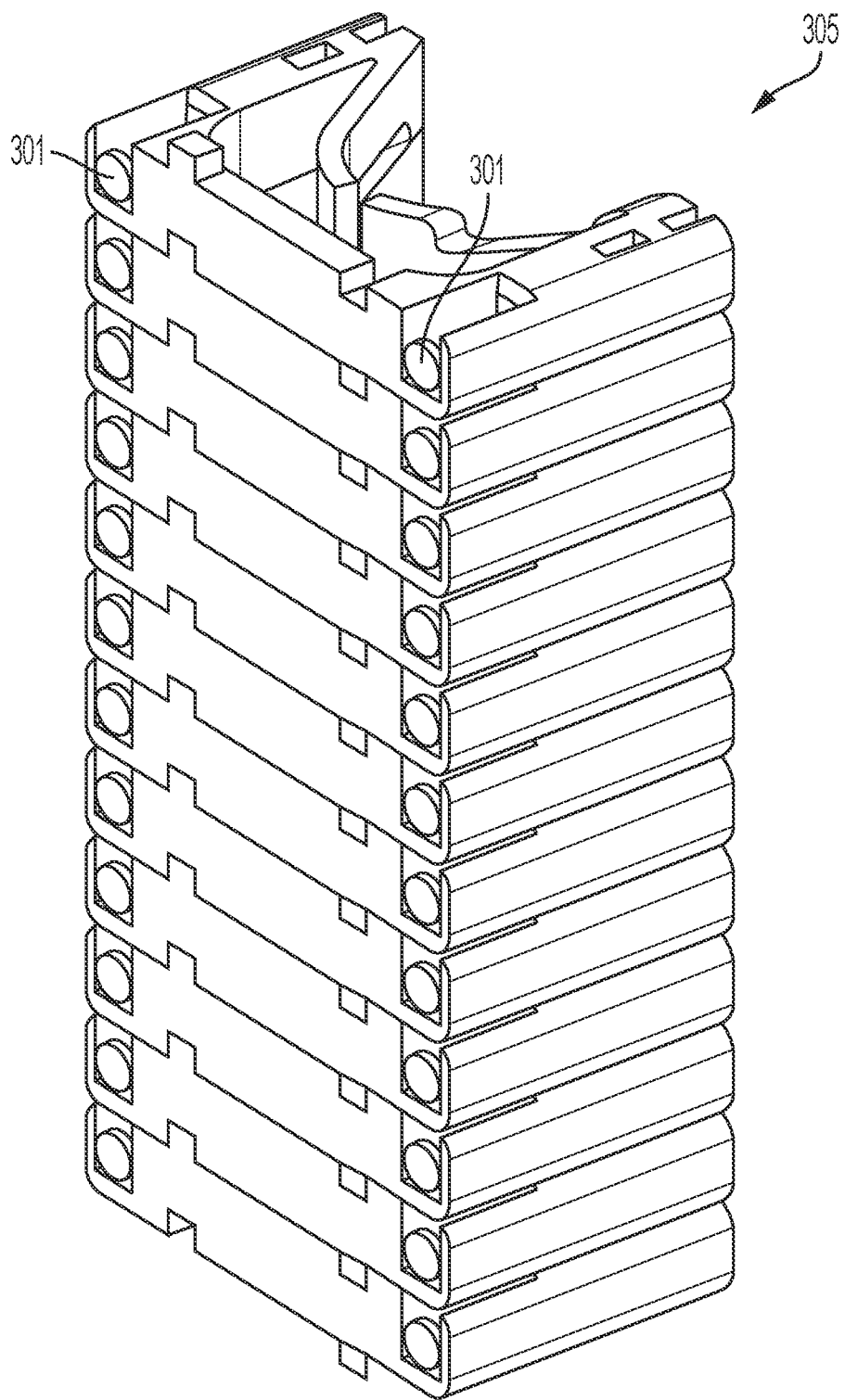
FIG. 19 is a perspective view of a collated stick of pipe clamps according to an exemplary embodiment of the present application.

A spring engine 100 is positioned at an end of the drive shaft 62 opposite the transmission 61. The spring engine 100 is secured in the housing 11 with a support structure 78. The spring engine 100 includes a pair of drive springs 101, 102 and drives a driver blade 110 (See FIG. 6). At the front of the tool there is a nose 201 and a contact trip 202. The contact trip 202 is depressed to allow operation of the driver 10 and avoid driving when the driver nose 201 is not adjacent to a pipe. A magazine 200 holds a plurality of pipe clamps, such as the pipe clamp 300 shown in FIGS. 15 and 16. The magazine 200 feeds the pipe clamps to the nose 201 for driving. A platform 204 is biased upwardly towards the nose 201 by a biasing member, as is shown in FIG. 3 to feed the pipe clamps to the correct position within the nose 201. The pipe clamps may be collated into a collated set of pipe clamps 305, as is shown in FIG. 19. When operated, the spring engine 100 drives the driver blade 110 so that it drives a pipe clamp 300 at the nose 201 into a workpiece.

Figure 4:
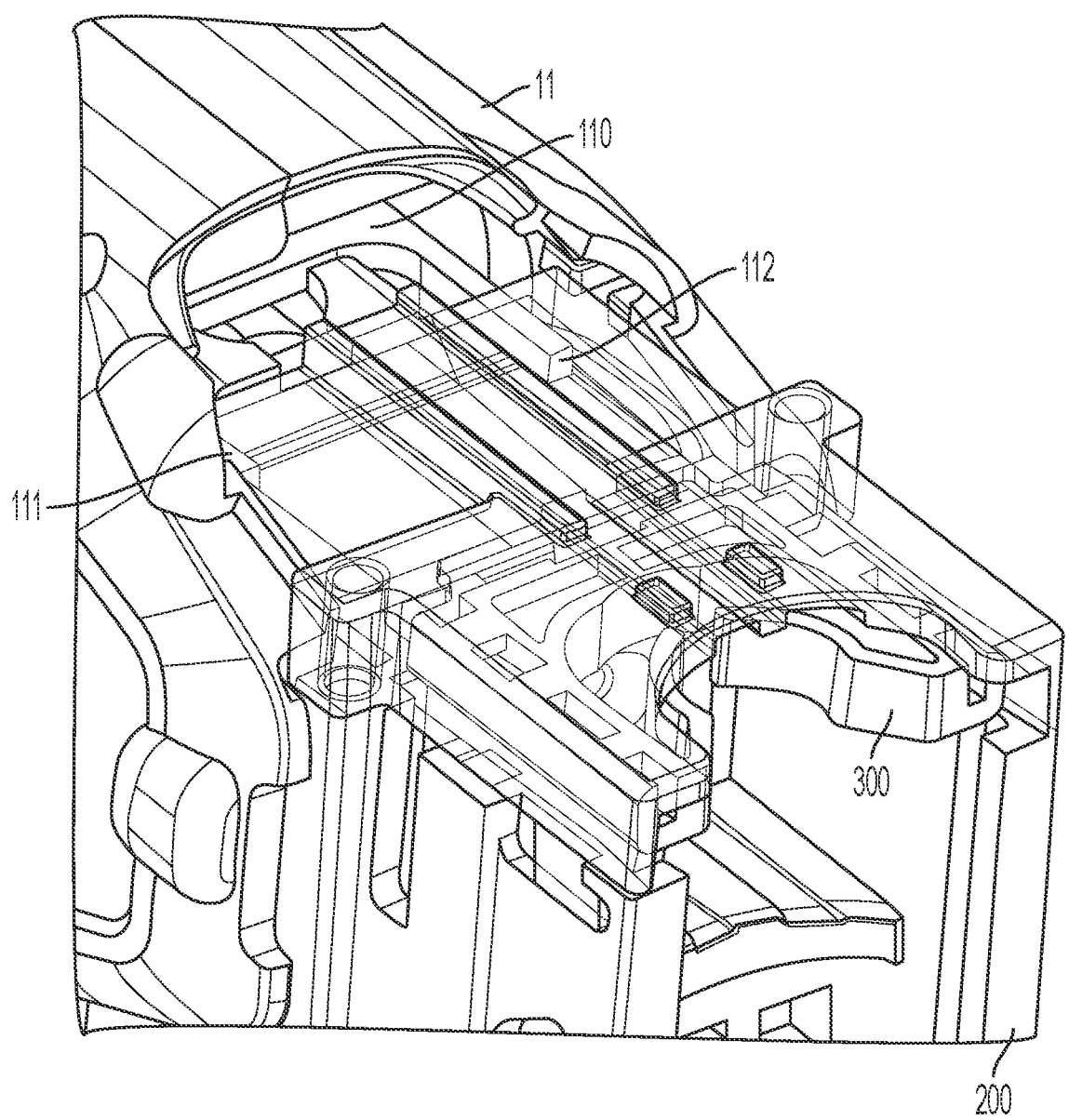
FIG. 4 is another perspective view of a pipe clamp driver according to an exemplary embodiment of the present application.
Figure 5:
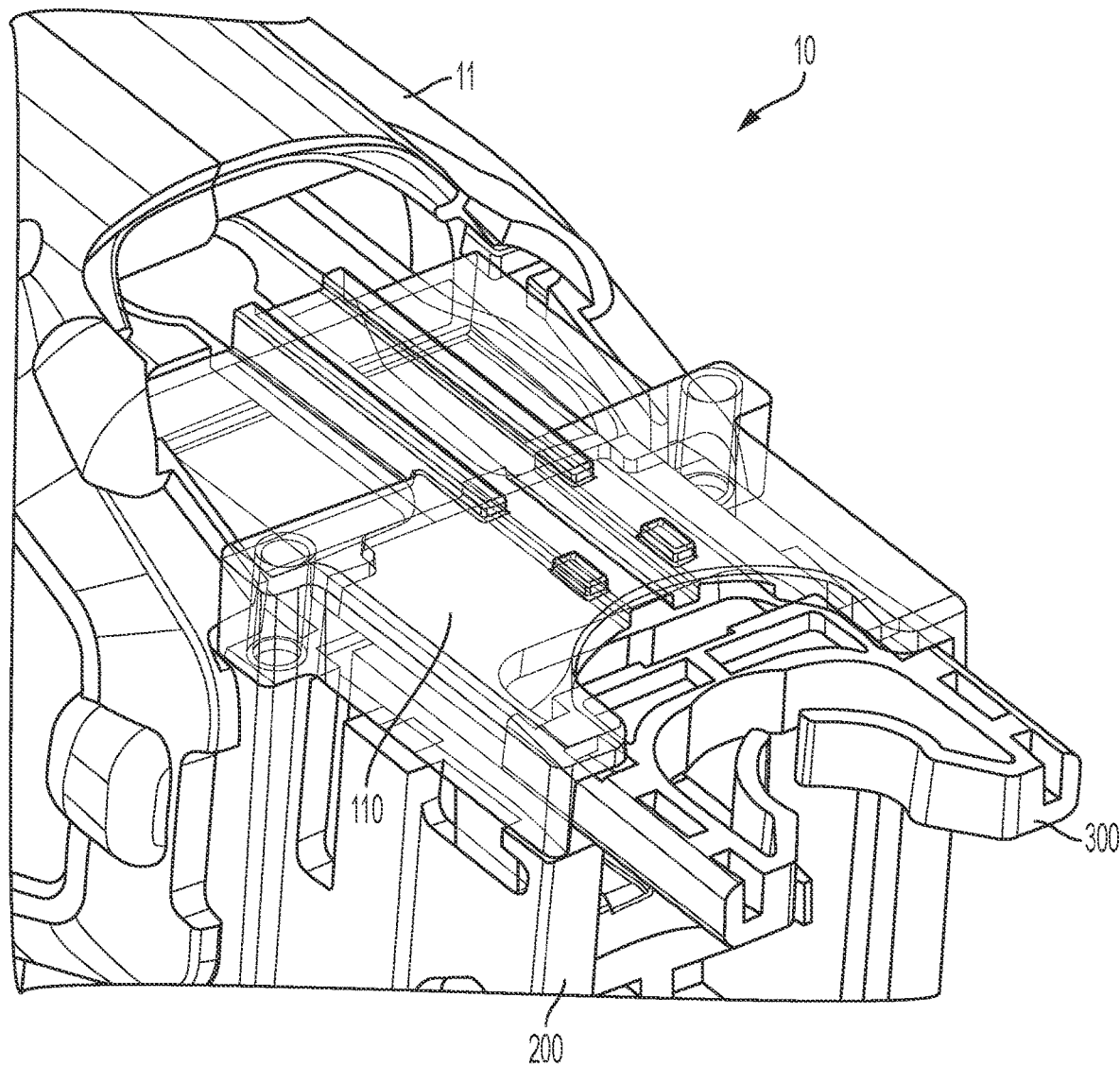
FIG. 5 is another perspective view of a pipe clamp driver according to an exemplary embodiment of the present application.

FIGS. 3-5 illustrate various front perspective views of the pipe clamp driver 10. FIG. 3 illustrates the pipe clamp driver 10 without any pipe clamps loaded into the magazine 200. FIG. 4 illustrates the driver blade 110 in a firing or full compression position. In this position, the driver blade 110 is ready to fire to drive the pipe clamp 300 into a workpiece. FIG. 5 illustrates the driver blade 110 in a pickup or full extension position. In the pickup/full extension position, the pipe clamp 300 has been driven by the driver blade 110 and will have been set into a workpiece when positioned against a workpiece before firing.

Figure 6:
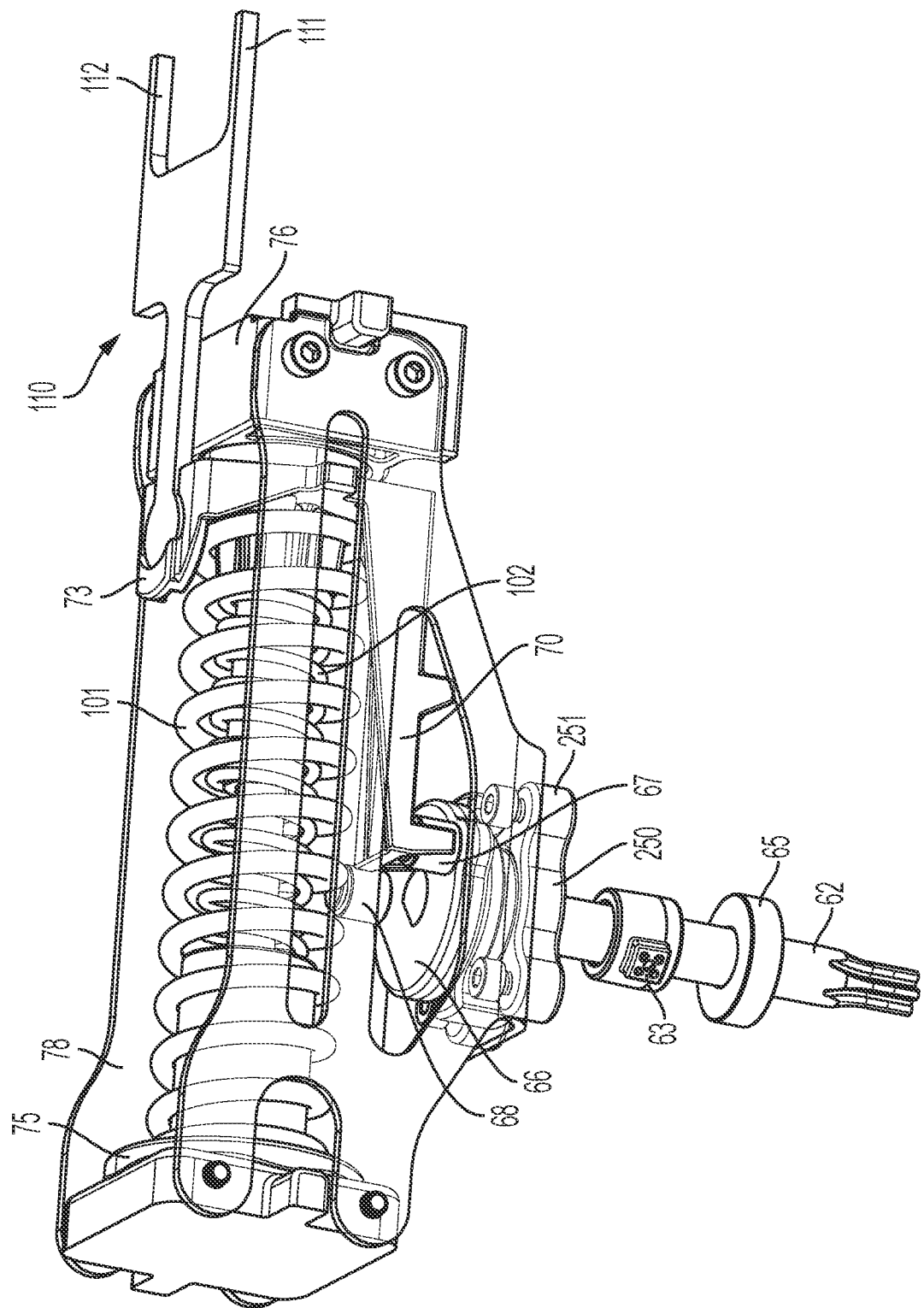
FIG. 6 is a perspective view of selected components of a pipe clamp driver according to an exemplary embodiment of the present application.
Figure 7:
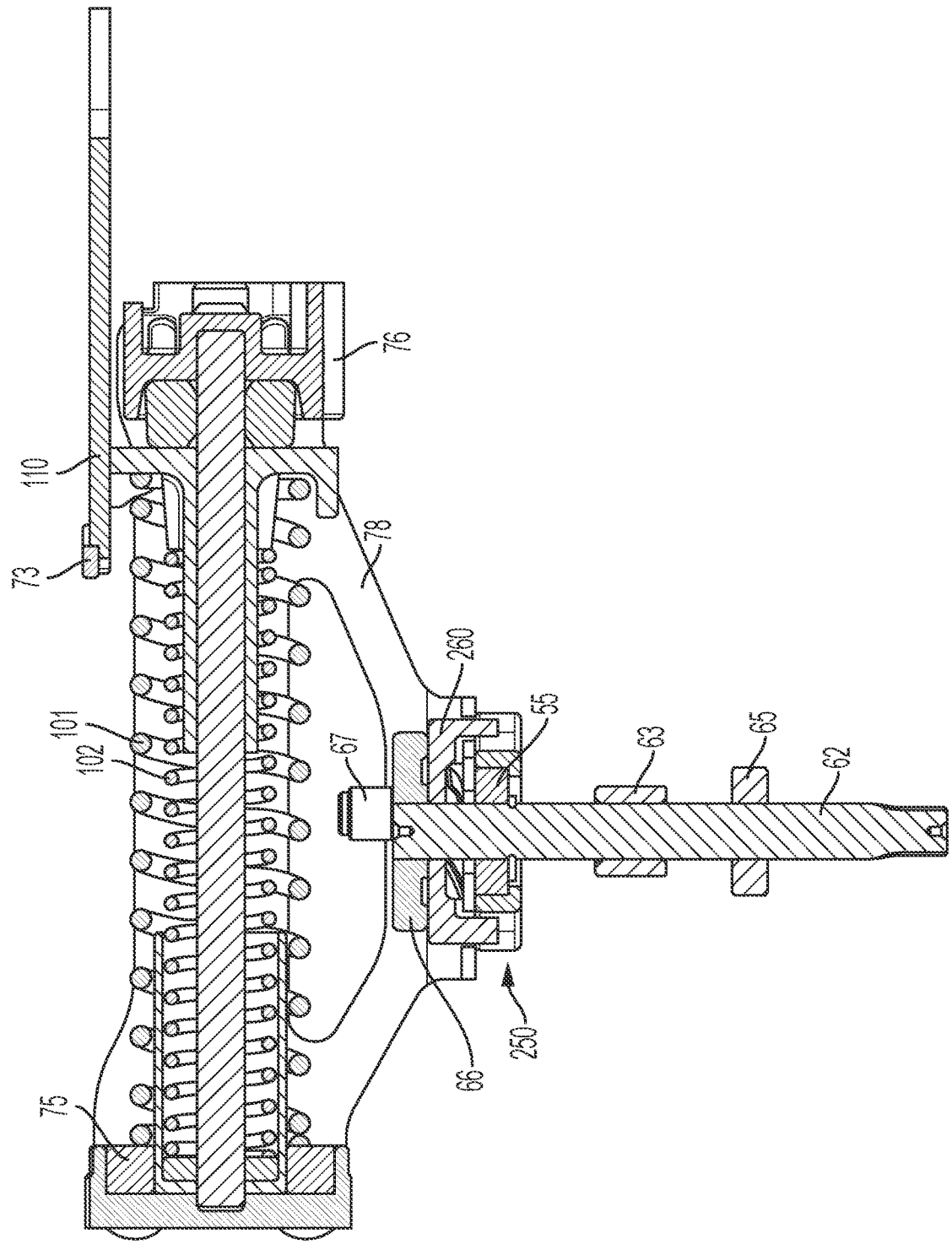
FIG. 7 is a cut-away side view of selected components of a pipe clamp driver according to an exemplary embodiment of the present application.
Figure 8:
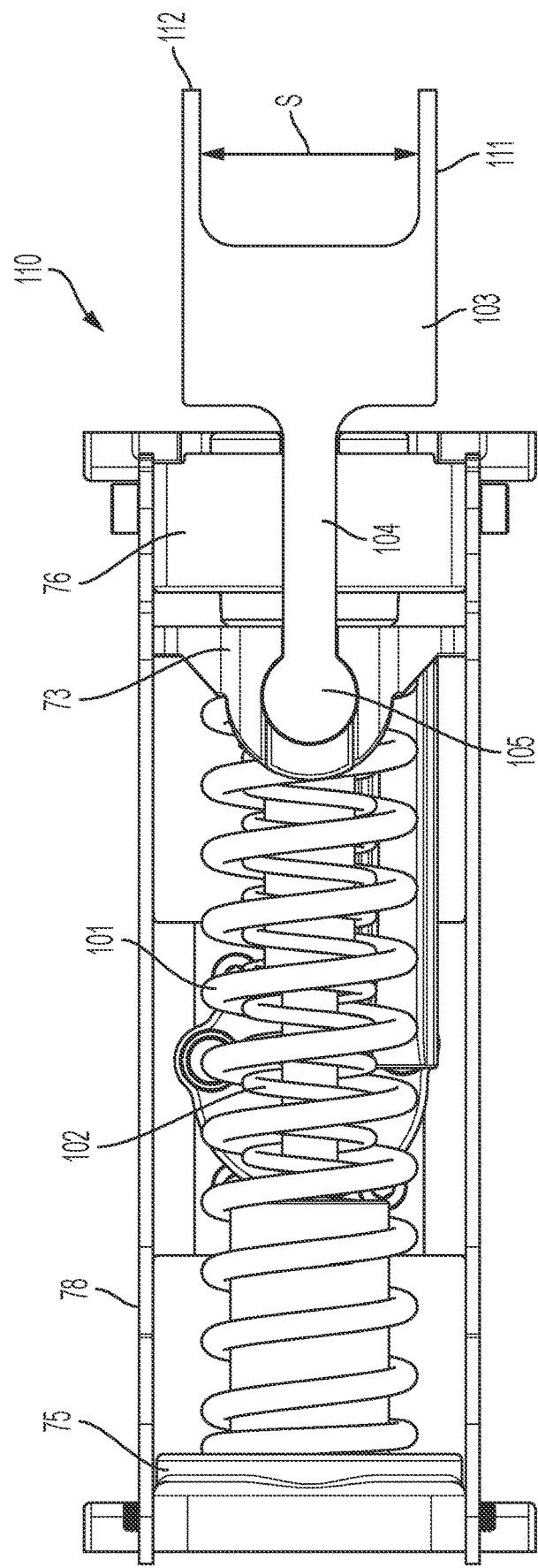
FIG. 8 is a top view of selected components of a pipe clamp driver according to an exemplary embodiment of the present application.
Figure 9:
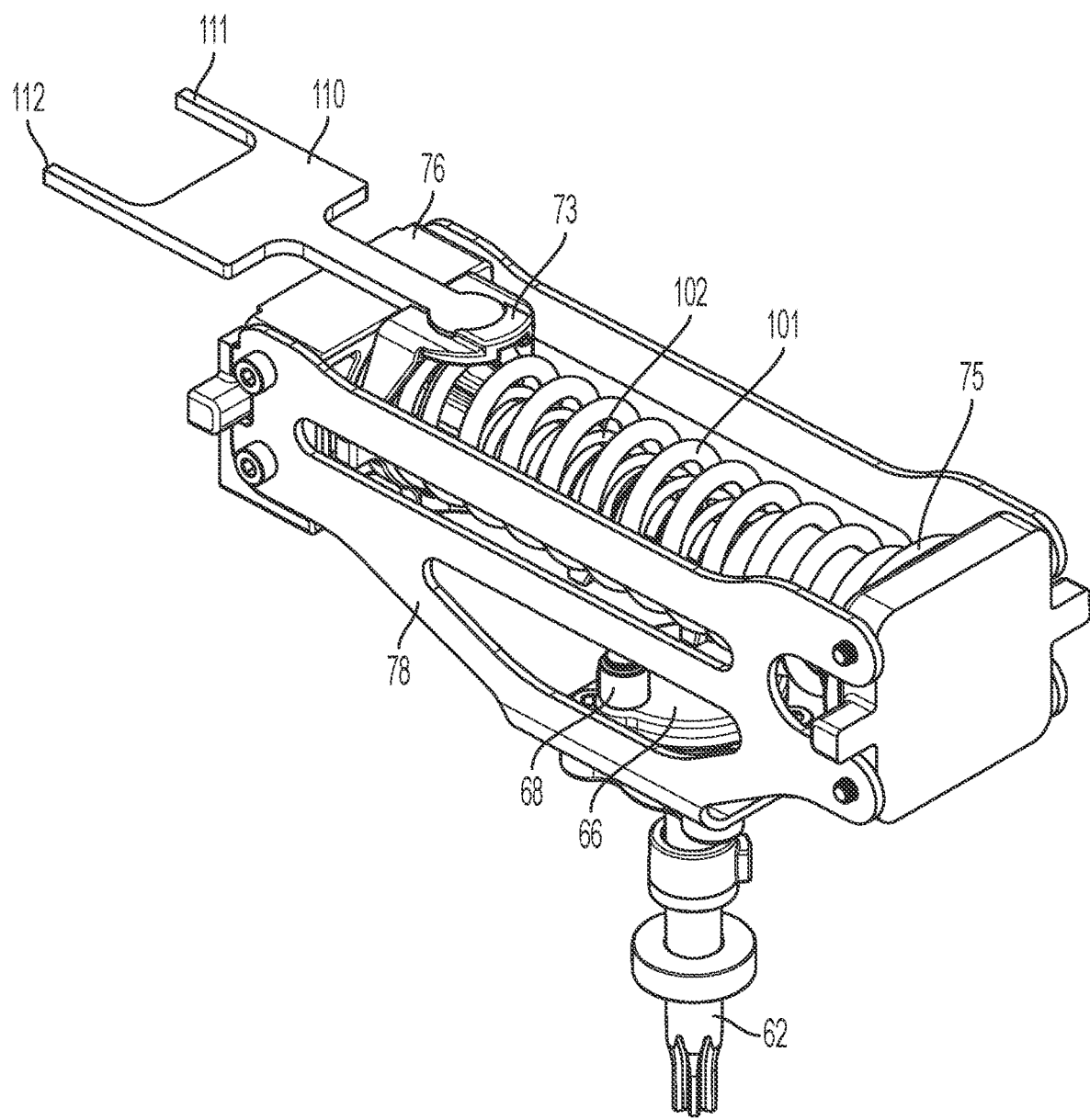
FIG. 9 is another perspective view of selected components of a pipe clamp driver according to an exemplary embodiment of the present application.

FIGS. 6-11 illustrate the mechanical spring engine 100 in more detail. FIG. 6 is a side perspective view of the mechanical spring engine 100 and FIG. 7 is a side cut-away view of the engine 100. As shown in FIGS. 6 and 7, the drive shaft 62 feeds into the spring engine 100. In particular, an end of the drive shaft 62 is connected to a drive wheel 66. The drive wheel 62 includes a pair of drive pins 67 and 68.

The spring engine 100 includes a pair of drive springs, outer drive spring 101 and inner drive spring 102. Outer drive spring 101 has a greater diameter than inner drive spring 102 and inner drive spring 102 is radially inside of outer drive spring 101. The springs are held on a front end by a carriage 70 and at a rear end by a rear support surface 75. As shown in FIGS. 6 and 7, the driver blade 110 is held by the carriage 70. Additionally, as shown in FIG. 6, the carriage 70 is connected to the drive wheel 66, and particularly is selectively connected to the drive wheel pins 67 and 68.

As shown, the driver blade 110 is connected to the carriage 70 at a carriage connector portion 73. This causes the driver blade 110 to move with the carriage, both forward toward the nose 200 of the driver 10 and rearward toward the rear support surface 75.

Figure 10:
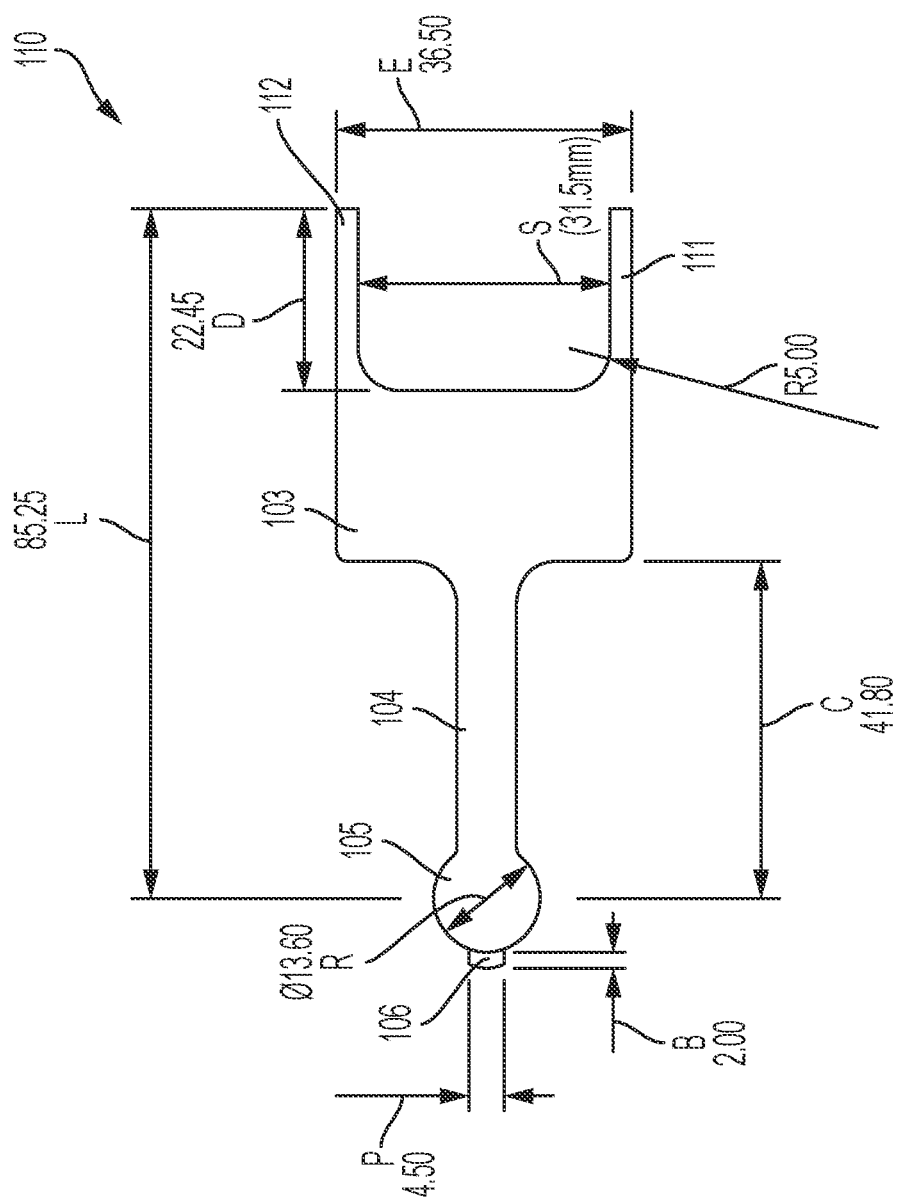
FIG. 10 is a plan view of a driver blade of a pipe clamp driver according to an exemplary embodiment of the present application.
Figure 11:
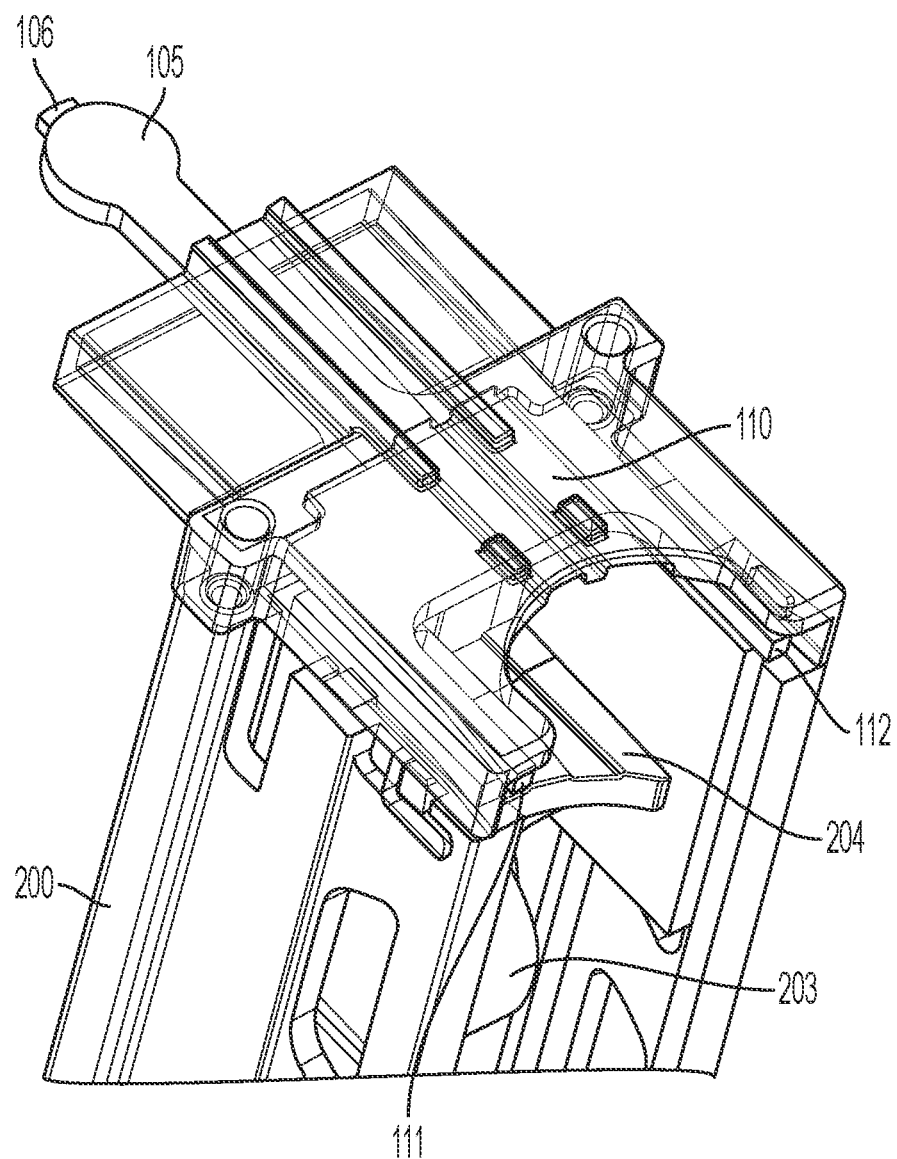
FIG. 11 is a perspective view of selected components of a pipe clamp driver according to an exemplary embodiment of the present application.

The driver blade 110 has a first projection 111 and a second projection 112. As shown in FIG. 10, the first projection and the second projection are spaced apart from one another at a distance S. The distance S may be at least 15 millimeters, at least 20 millimeters, at least 25 millimeters; at least 30 millimeters; at least 40 millimeters; or at least 50 millimeters. The distance S is measured in a direction transverse to a direction of travel of the carriage 70 and the driver blade 110. The projections 111 and 112 contact nails 301 in the pipe clamp 300. Having a forked driver blade 110 including two projections 111, 112, allows the driver blade 110 to contact and drive at two different points at the same time. That is, the projection 111 can contact one nail 301 on a first side of a pipe clamp 300 while the projection 112 contacts another nail 301 on an opposite side of the pipe clamp 300. This allows a relatively wide fastener, here a pipe clamp 300, to be driven by the driver 10.

In operation, the motor 60 drives the transmission 61, which rotates the drive wheel 66. The drive wheel pins 67 and 68 interact with the carriage 70 to move the carriage 70 backwards towards the rear support surface 75 and compress the springs 101 and 102. The carriage 70 is then decoupled and driven forward by the springs 101 and 102. The driver blade 110 is driven by the carriage 70. The driver blade 110 contacts the pipe clamp 300 to drive the pipe clamp 300 held at the nose 201.

FIG. 10 illustrates an exemplary embodiment of the driver blade 110, including dimensions of the exemplary embodiment. As shown, the driver blade 110 includes a body portion 103 and a first projection 101 and a second projection 102 projecting from the body portion 103. The driver blade 110 also includes a connection portion 105 with a connector projection 106. The connector portion 105 connects with the carriage 70 at the carriage connector portion 73. An extension portion 104 connects the connector portion 105 with the body portion 103.

FIG. 10 provides dimensions for the exemplary embodiment in millimeters. In particular, FIG. 10 illustrates a dimension A of 4.5 millimeters (mm); a dimension B of 2 mm; a dimension C of 41.8 mm; a dimension D of 22.45 mm; a dimension E of 36.5 mm; a dimension L of 85.25 mm; a dimension R of 13.6 mm; and a dimension S of 31.5 mm. Although those are the specific dimensions of the exemplary embodiment shown in FIG. 10, the present application contemplates that the dimensions may vary in different ranges or limits. For example, each of the various shown dimensions (including, at least, A, B, C, D, E, R, L and S) may be 10 percent more or less than those shown. The dimensions may be 20 percent more or less than those shown. The dimensions may be 30 percent more or less than those shown; 50 percent more or less than those shown; 100 percent more or less than those shown; 150 percent more or less than those shown; or 200 percent more or less than those shown.

In some embodiments, the depth D, which is equivalent to the length of the projections 101 and 102, may be less than 50 millimeters; less than 40 millimeters; less than 30 millimeters or less than 20 millimeters. The depth D may also be more than 5 millimeters; more than 10 millimeters; more than 15 millimeters or more than 20 millimeters.

Figure 14:
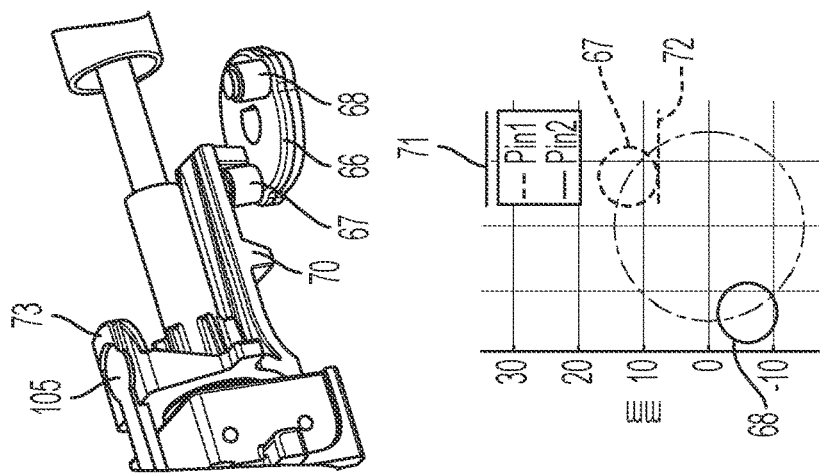
FIG. 14 is an explanatory view of a drive mechanism of a pipe clamp driver according to an exemplary embodiment of the present application.
Figure 13:
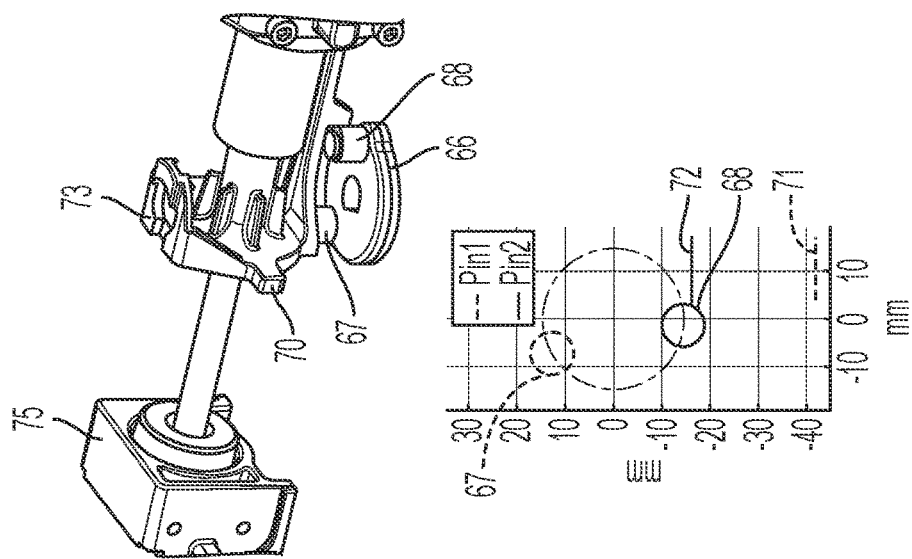
FIG. 13 is an explanatory view of a drive mechanism of a pipe clamp driver according to an exemplary embodiment of the present application.
Figure 12:
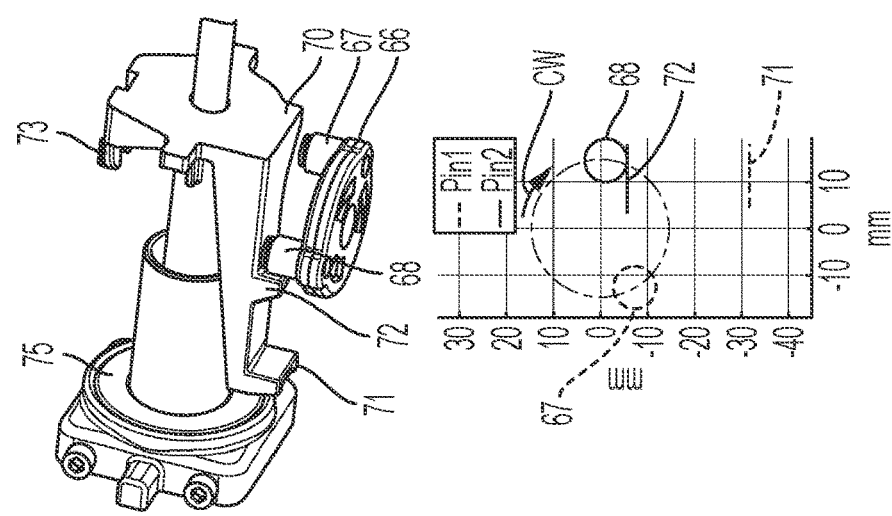
FIG. 12 is an explanatory view of a drive mechanism of a pipe clamp driver according to an exemplary embodiment of the present application.

FIGS. 12-14 further illustrate operation of the drive of the pipe clamp driver 10. FIG. 12-14 illustrate interaction between the drive wheel 66, carriage 70 and spring engine 100. The springs 101 and 102 are not shown in the illustration for the purposes of explanation. FIG. 12 shows the driver 10 in a home position. FIG. 13 illustrates the driver 10 in a firing position and FIG. 14 illustrates the driver 10 in a pick-up position.

As discussed above, the motor 60 drives the transmission 61. The transmission turns a drive shaft 62. The drive wheel 66 interacts with tabs 71 and 72 on the carriage, which pulls the carriage 70 back as the drive wheel 66 rotates. This compresses the drive springs 101 and 102, which are disposed between the carriage 70 and the rear support surface 75.

The clamp driver 10 starts at the home position shown in FIG. 12 with the springs 101 and 102 partially compressed. In the exemplary embodiment shown in FIG. 12, the second pin 68 contacts the second tab 72. This is shown schematically below the perspective illustration. As will be appreciated, the second pin 68 pulls the carriage 70 backwards towards the rear support surface 75 to compress the springs 101 and 102. As the drive wheel 66 rotates clockwise (CW), the pin 68 rotates out of engagement with the second tab 72. As soon as the pin 68 is no longer in contact with the tab 72, the carriage 70 is in the firing position shown in FIG. 13. At this time, the carriage 70 is no longer being held back by the drive wheel 66 and the compressed springs 101 and 102 accelerate the carriage 70 forwards towards the front support 76.

The driver blade 110 is a forked blade 110. The forked driver blade 110 strikes the two nails 301 inside the pipe clamp 300. In particular, a first projection 111 of the driver blade 110 contacts one nail 301 and a second projection 112 contacts a second nail 301. After the drive is completed, the drive wheel 66 continues rotating until it is in the pick-up position, shown in FIG. 13, at which time the drive wheel 66 begins pulling the carriage 70 backwards towards the rear support 75, thereby compressing the drive springs 101 and 102 for another actuation. There are two pins 67 and 68 and two tabs 71 and 72 and a handoff between pins during the sequence. During the handoff, pin 67 applies a force to tab 71 until it rolls off the edge of tab 71. Then the carriage 70 moves forward for a brief instant until tab 72 begins to apply force to tab 72. This is what is referred to as a handoff between the pins 67 and 68. As described further below, there may be more or fewer than two pins and two tabs.

Once the home position magnet 63 is detected by the home position sensor 64, which in this case is a hall sensor, the motor 60 begins its braking sequence to stop the drive wheel rotation at the home position (FIG. 12). An anti-backdrive ratchet, described below, locks the position of the drive wheel 66 in comparison to the support structure 78, preventing the drive springs 101 and 102 from decompressing after the motor 60 is de-energized.

Figure 16:
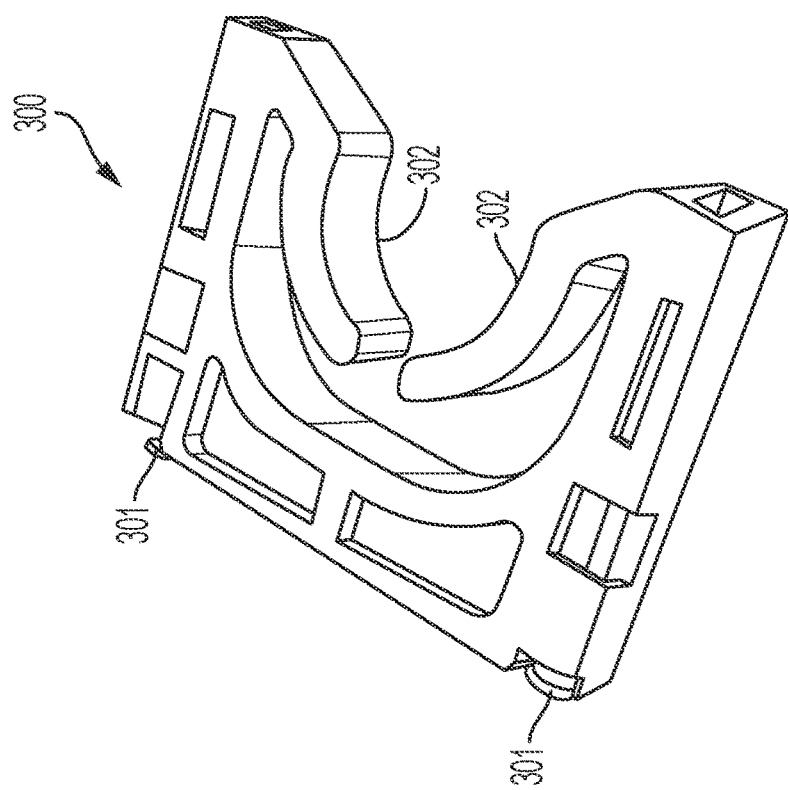
FIG. 16 is another perspective view of a pipe clamp according to an exemplary embodiment of the present application.
Figure 15:
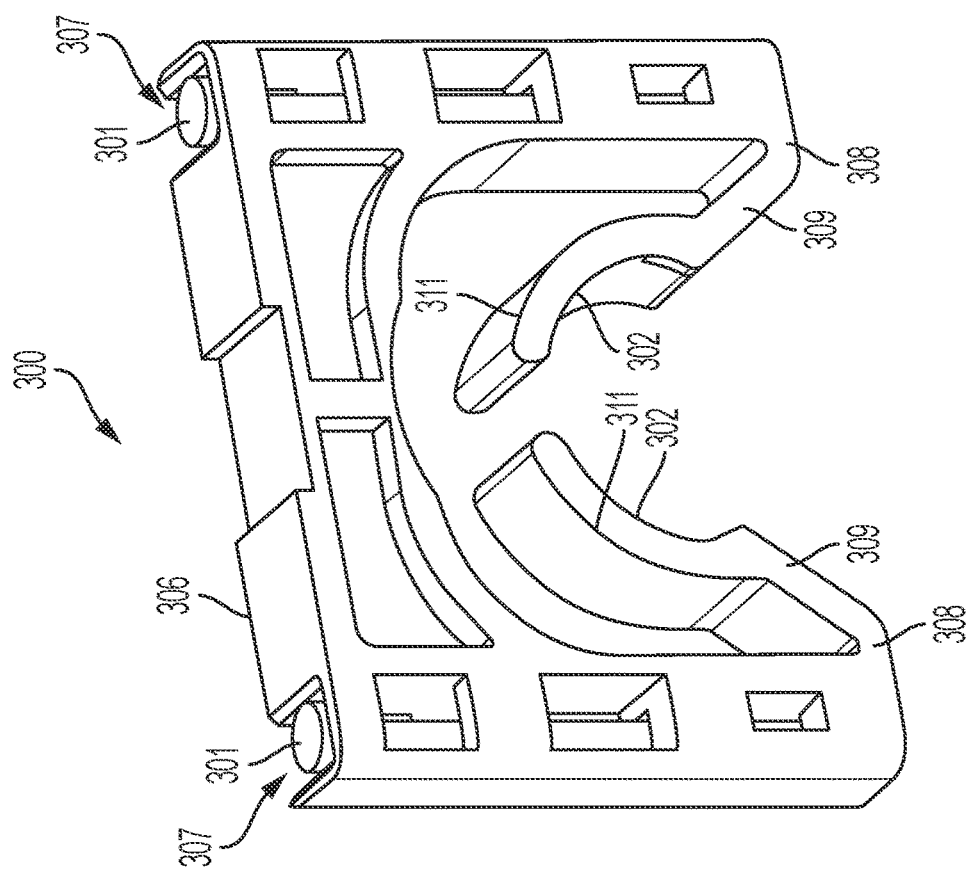
FIG. 15 is a perspective view of a pipe clamp according to an exemplary embodiment of the present application.
Figure 18:
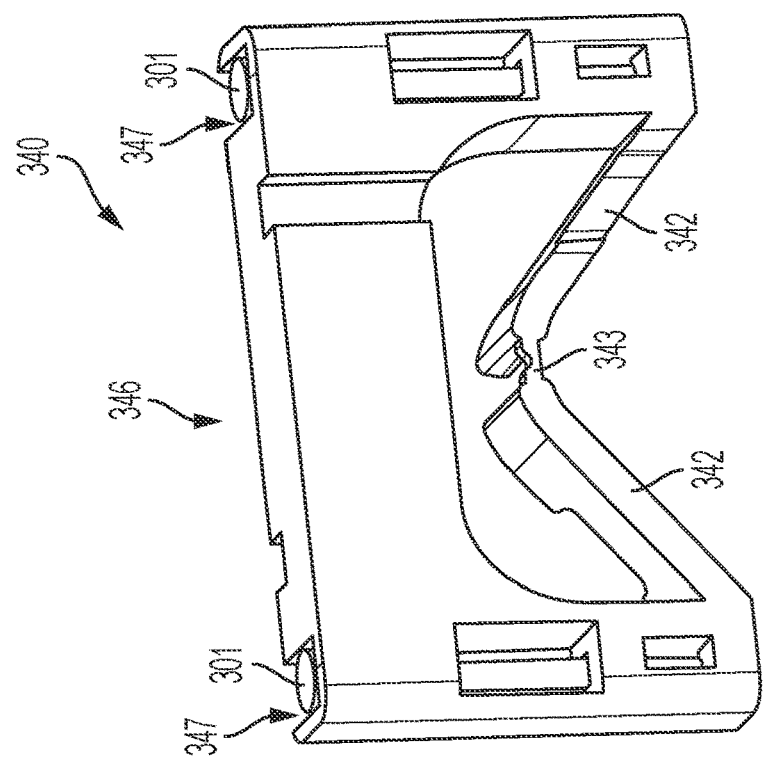
FIG. 18 is a perspective view of a pipe clamp according to another exemplary embodiment of the present application.
Figure 17:
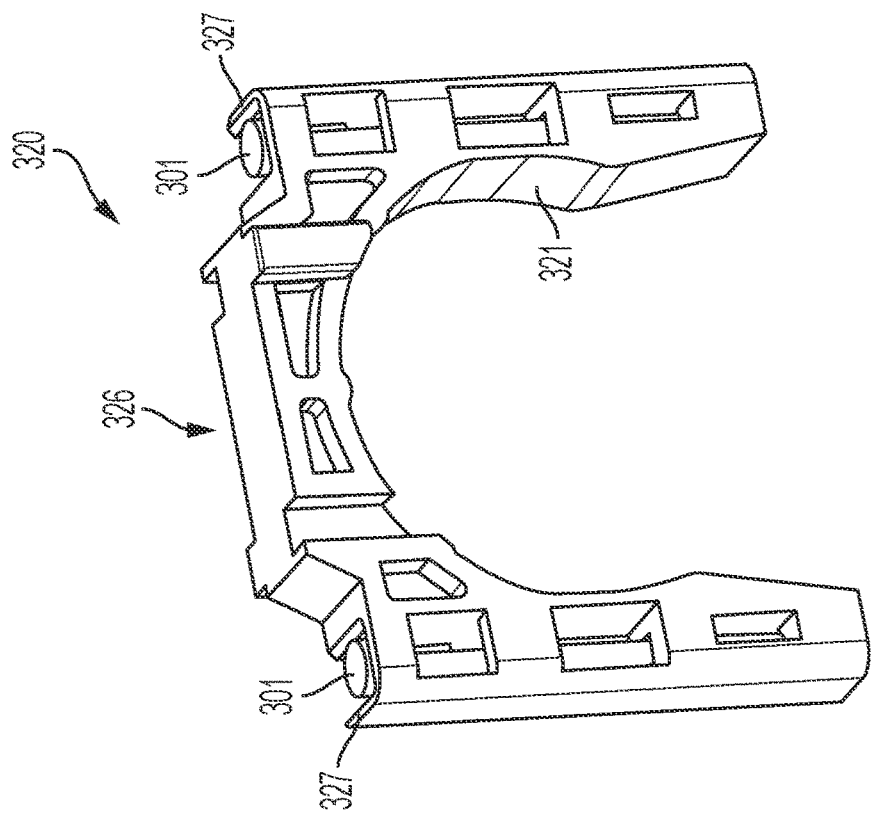
FIG. 17 is a perspective view of a pipe clamp according to another exemplary embodiment of the present application.

Exemplary embodiments of pipe clamps which can be used with the pipe clamp driver 10 are shown in FIGS. 15-18. FIGS. 15 and 16, illustrate a first embodiment. FIG. 17 illustrates a second exemplary embodiment and FIG. 18 illustrates a third exemplary embodiment.

The pipe clamps 300, 320, 340 are designed to be driven by the pipe clamp driver 10 over a pipe and into a workpiece, such as a wood surface. FIGS. 15 and 16 illustrate a first exemplary embodiment of a pipe clamp 300. The pipe clamp 300 includes a body portion 306. The body portion 306 includes a pair of receiving portions 307. The receiving portion 307 are generally through holes which can receive a fastener, such as nails 301. In the exemplary embodiment, the pipe clamp 300 includes a pair of nails 301, one in each receiving portion 307. As shown, the nails 301 are at opposite ends of the pipe clamp 300.

The pipe clamp 300 also has a pair of clamp fingers 302 which extend from the clamp body 306 at connection point 308. In the exemplary embodiment, the clamp fingers 302 have a straight portion 309 and a curved portion 311. The curved portions 311 can be made to engage a pipe and the straight portions 309 can be used to help separate the pipe being held from a workpiece to which the pipe clamp 300 is being fastened. The clamp fingers 302 are rotatable so that they can hold and secure pipes with different diameters. As discussed above, in operation of the pipe clamp driver 10, the nails 301 are driven by the driver blade 110 with projections 111 and 112. This drives the nails 301 into a work surface, such as a wood surface. A pipe (not shown) is then clamped between the fingers 302 and the work surface.

FIG. 17 is a second exemplary embodiment of a pipe clamp 320. As shown in FIG. 17, the pipe clamp 320 similarly has a pipe clamp body 326 and a pair of receiving portions 327 for receiving a fastener. Additionally, the pipe clamp 320 includes a pair of nails 301 for use with the blade clamp driver 10. In this instance, the pipe clamp 320 does not include flexible finders. Instead, the pipe is simply held in the pipe clamp 320 and may contact the pipe clamp surface 321.

FIG. 18 is another exemplary embodiment of a pipe clamp. The pipe clamp 340 includes a pipe clamp body 346, receiving portions 347 and a pair of nails 301, like the other embodiments, and can be used with the pipe clamp driver 10. The pipe clamp 340 includes fingers 342 that are generally straight. Additionally, a break-away portion 343 connects adjacent ends of the fingers 342.

Figure 20:
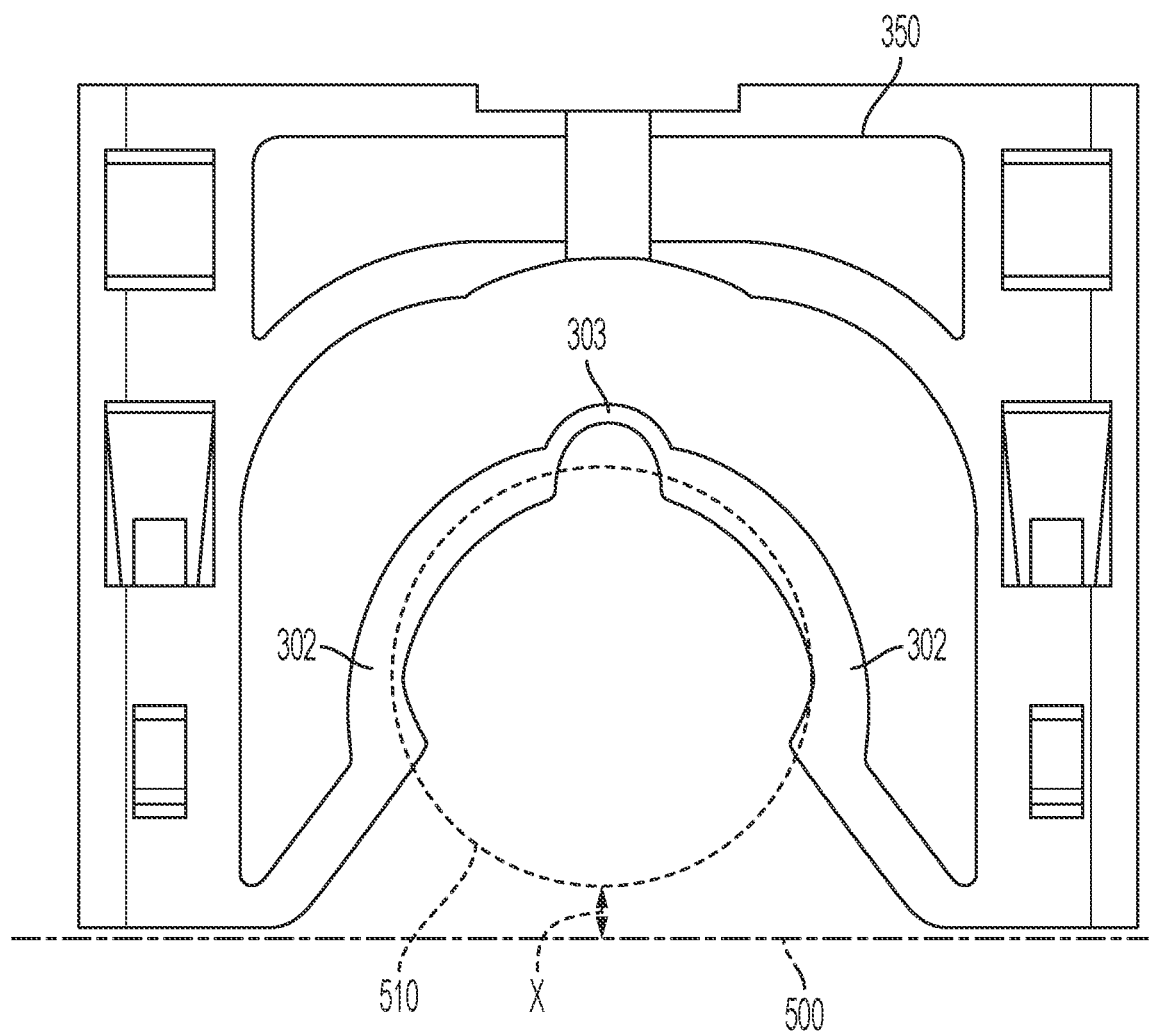
FIG. 20 is a side view of a pipe clamp according to an exemplary embodiment of the present application.
Figure 21:
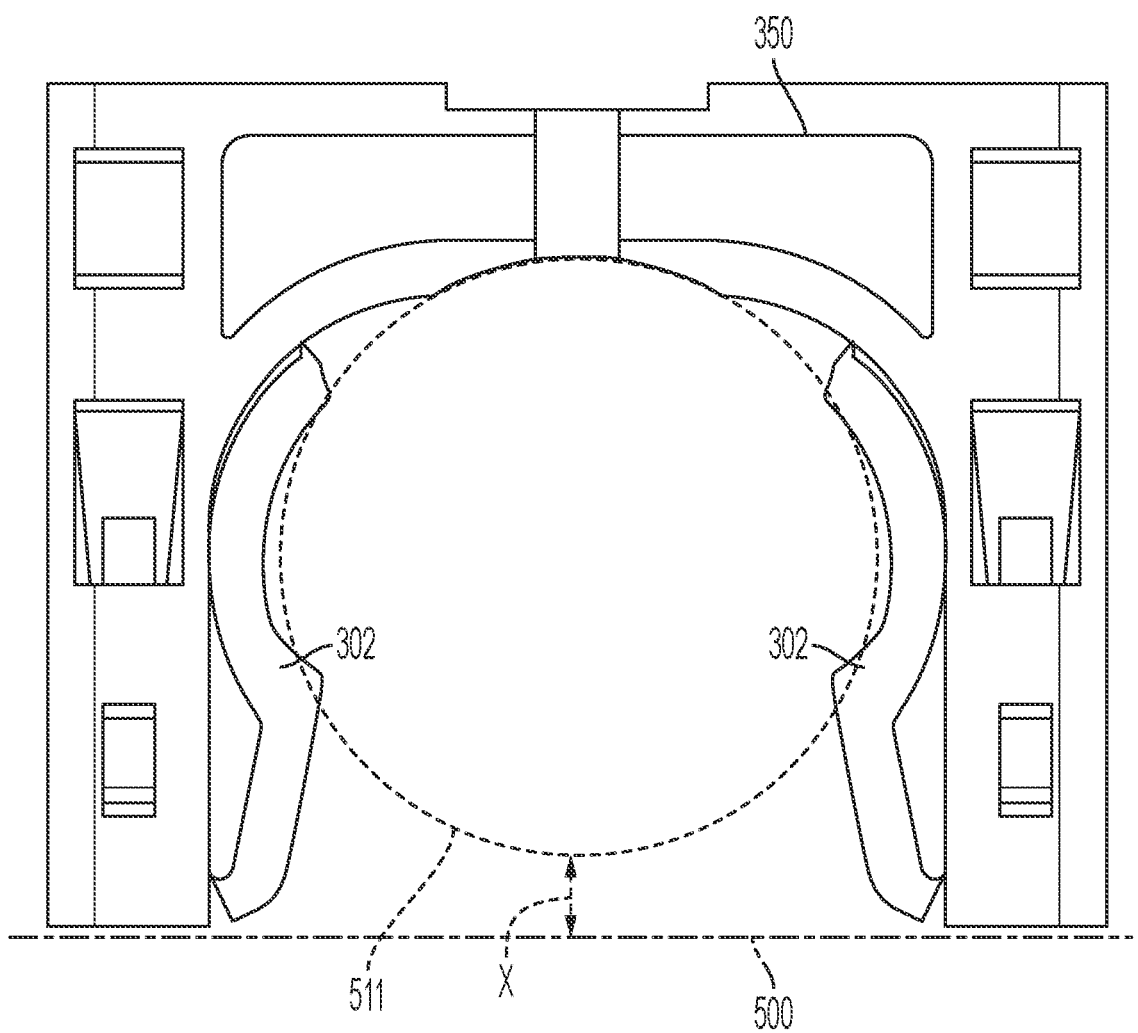
FIG. 21 is a side view of a pipe clamp according to an exemplary embodiment of the present application.

FIGS. 20 and 21 illustrate a pipe clamp 350 after it has been driven into a work-surface 500 to secure a pipe. The pipe clamp 350 is the same as pipe clamp 300, except that it additionally has a break-away portion 303. FIG. 20 illustrates the pipe clamp 350 securing a pipe 510 of a first diameter to a surface 500. As shown, the pipe 510 is separated from the work surface as shown by the arrow X. FIG. 21 illustrates the pipe clamp 350 securing a pipe 511 with a larger diameter than the pipe 510. As shown in FIG. 21, the arms 302 rotate away from one another and the break-away portion 303 is broken during driving when the larger pipe 511 is secured. Again, the pipe 511 is separated from the surface 500 as shown by the arrow X. The distance of separation can vary.

Figure 22:
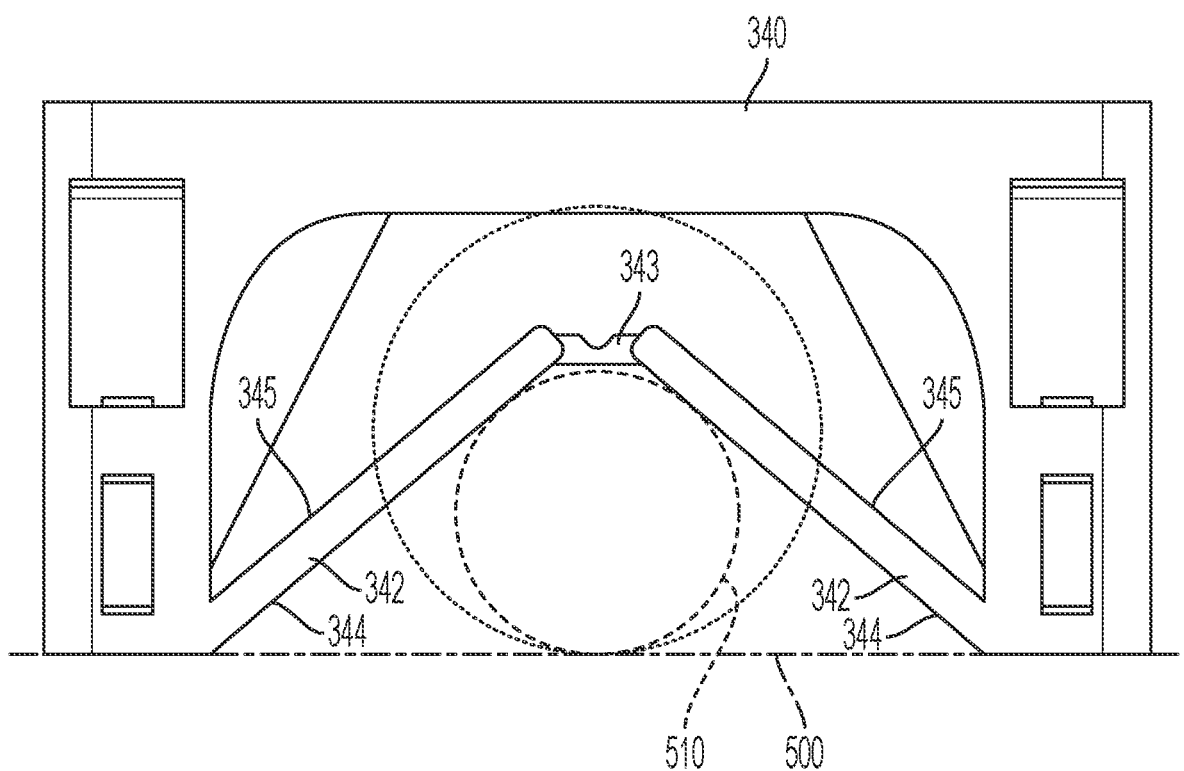
FIG. 22 is a side view of a pipe clamp according to an exemplary embodiment of the present application.
Figure 23:
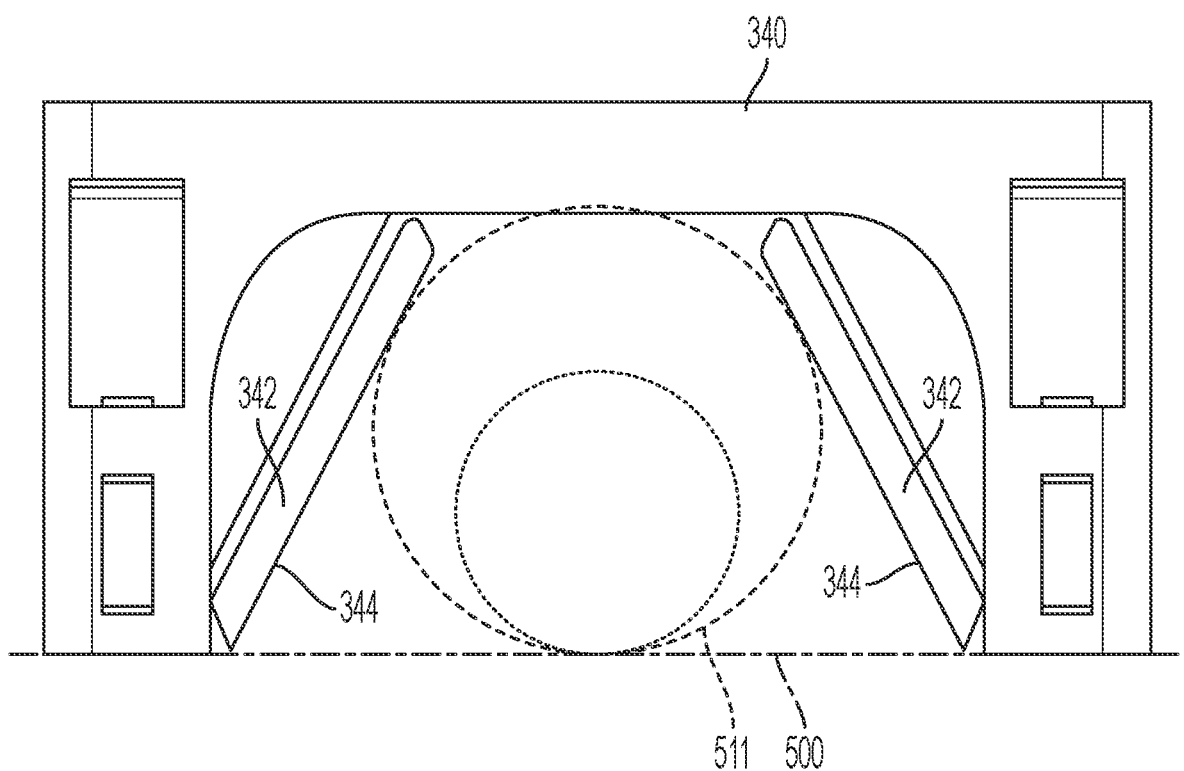
FIG. 23 is a side view of a pipe clamp according to an exemplary embodiment of the present application.

FIGS. 22 and 23 illustrate the pipe clamp 340 shown previously in FIG. 18 in usage. The pipe clamp 340 includes straight arms 342 and a break-away section 343. In particular, the arms 342 have a first surface 344 and a second surface 345. The first surface 344 is substantially parallel to the second surface 345. Additionally, the first surface 344 and the second surface 345 are substantially flat. The break-away section 343 is a section of lesser strength which may be created by using less material or a different material, for example. FIG. 22 illustrates the pipe clamp 340 holding the relatively small pipe 510 to a workpiece 500. As shown in FIG. 22, the shape of the arms 342 cause the pipe 510 to contact the workpiece 500 directly. FIG. 23 illustrates the pipe clamp 340 holding the larger pipe 511. As shown in FIG. 22, when the smaller pipe 510 is secured by the pipe clamp 340, the break-away portion 343 remains intact. As shown in FIG. 23, when the larger pipe 511 is secured by the pipe clamp 340, the break-away portion 343 breaks to allow further rotation of the arms 342.

Figure 25:
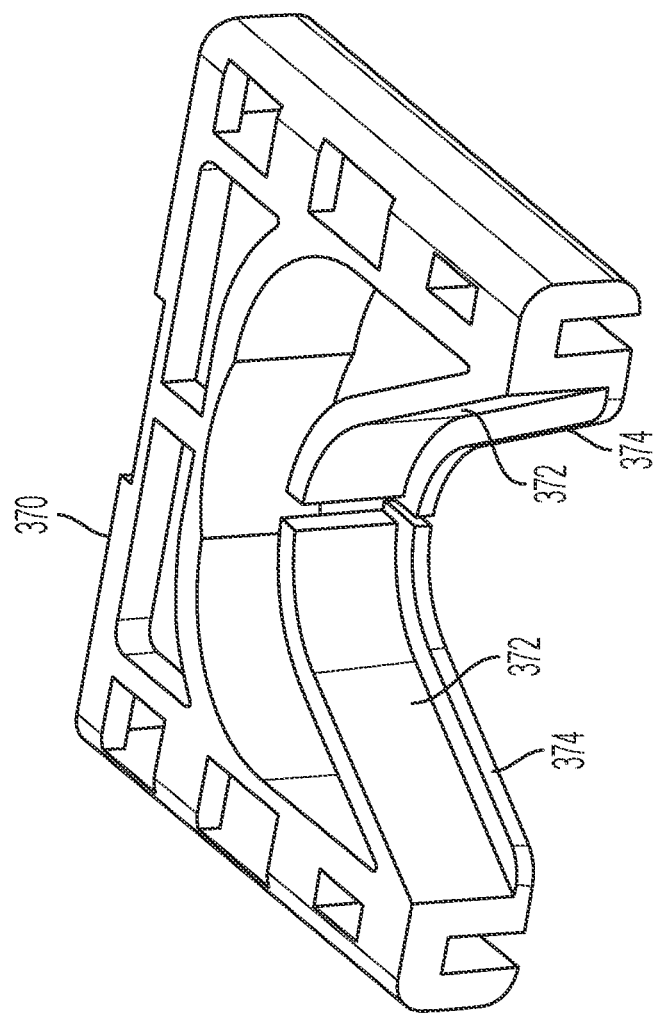
FIG. 25 is a perspective view of a pipe clamp according to an exemplary embodiment of the present application.
Figure 24:
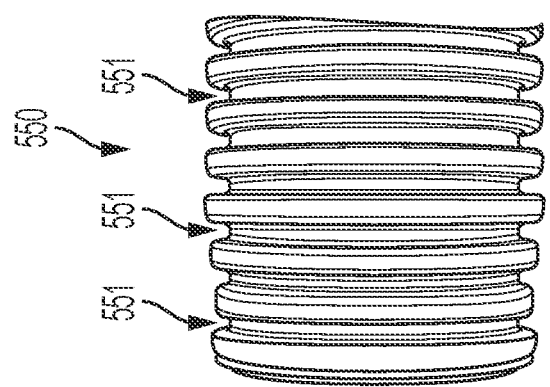
FIG. 24 is a side view of a corrugated pipe.
Figure 27:
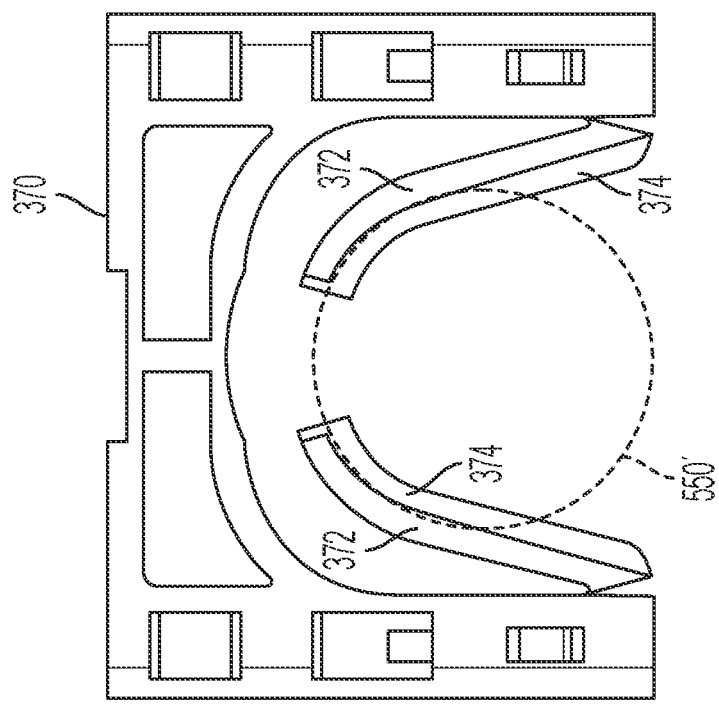
FIG. 27 is a side view of a pipe clamp according to an exemplary embodiment of the present application.
Figure 26:
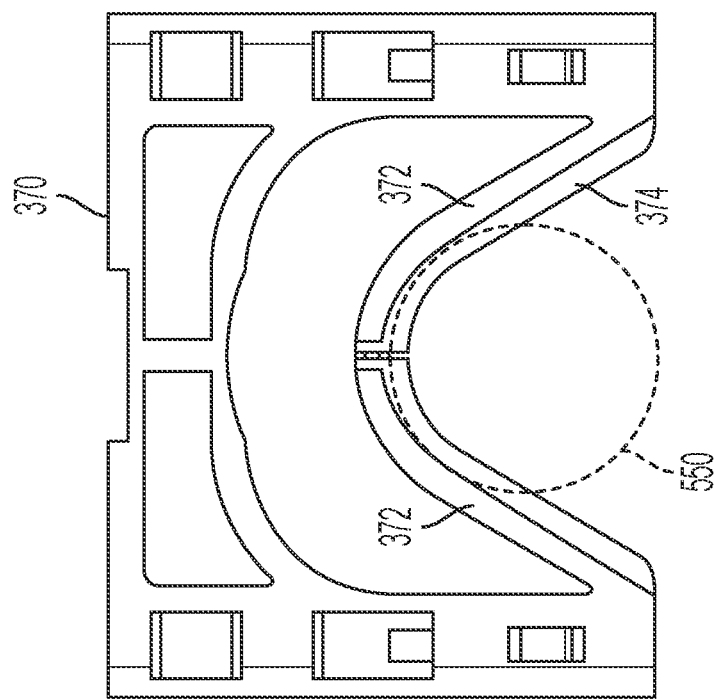
FIG. 26 is a side view of a pipe clamp according to an exemplary embodiment of the present application.
Figure 28:
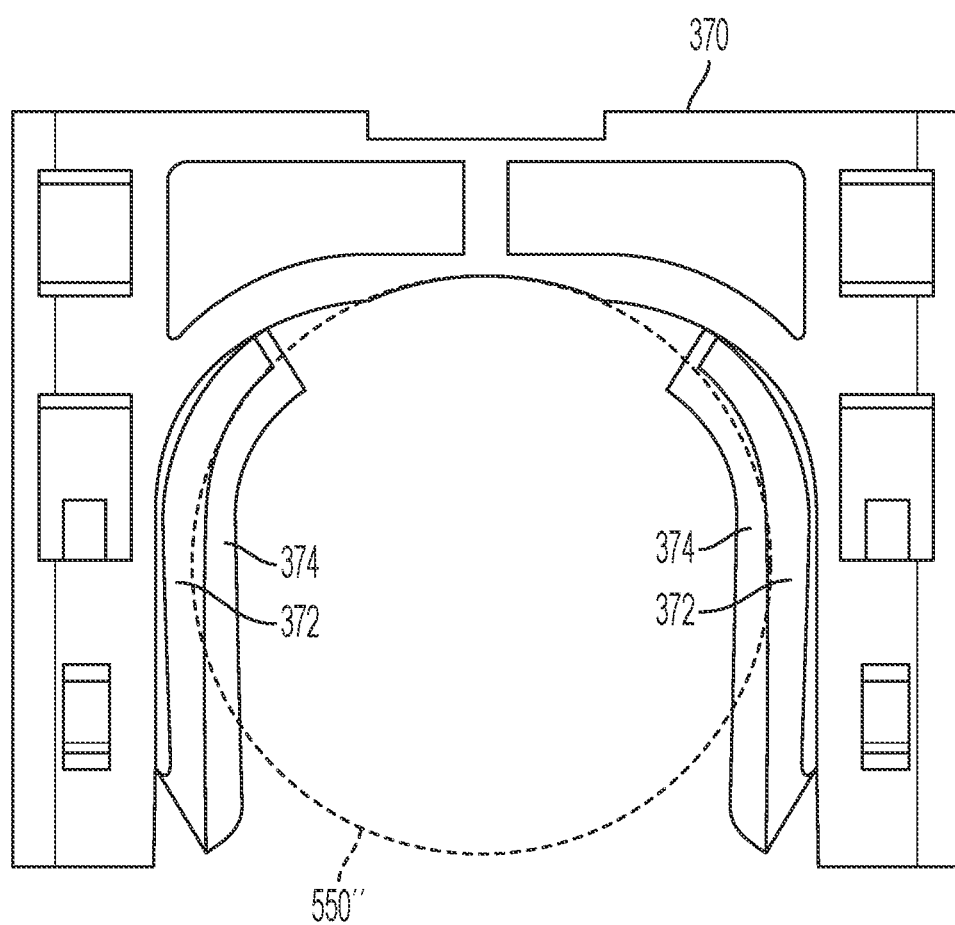
FIG. 28 is a side view of a pipe clamp according to an exemplary embodiment of the present application.

FIGS. 25-28 illustrate another exemplary embodiment of a pipe clamp 370. The pipe clamp 370 is configured to hold a corrugated pipe, such as the corrugated pipe 550 shown in FIG. 24. Corrugated pipes, such as the pipe 550, include regular grooves. The pipe clamp 370 includes arms 372 that include ribs 374. The ribs fit into one of the grooves 551 of the corrugated pipe 550 and stop the corrugated pipe from moving axially. FIGS. 23-25 illustrate the pipe clamp 370 holding corrugated pipes 550, 550' and 550" of various sizes. Although not shown in the exemplary embodiment, the pipe clamp 370 may also include a break-away portion connecting ends of the arms 372. In the exemplary embodiment, the pipes 550, 550' and 550" are held in a position where they would contact a workpiece. However, in some embodiments the pipes 550, 550' and 550" could be held at a distance from the workpiece into which the clamp 370 is driven.

All of the above-described pipe clamps are configured to be driven by the pipe clamp driver 10 described above. For example, each of the pipe clamps includes a pair of spaced apart nails 301 as shown in, for example, FIGS. 15-18. These nails 301 correspond to the projections 111 and 112 of the driver blade 110. Additionally, each of the above-described pipe clamps may be collated, as shown in the exemplary embodiment of FIG. 19, and provided to the magazine 200 where they are fed for driving. It is also contemplated that the various features of the pipe clamps may be combined or replaced with one another in the various embodiments. For example, a rib feature such as the ribs 374 may be added to arms of any of the other embodiments, in which case the ribs may conform to the shape of the particular arms. Additionally, a break-away portion between ends of arms may be added or removed from any of the embodiments. Additionally, the arms of the pipe clamps may be substituted among the various embodiments. For example, the arms of the various pipe clamps may be substantially straight, they may be substantially curved or they may have both straight and curved portions.

FIGS. 29-41 illustrate an exemplary embodiment of an anti-backdrive system. The anti-backdrive system is a ratchet system configured to prevent the drive wheel 66 from rotating backwards when the motor 60 is de-energized. The exemplary embodiment shown in the present application accomplishes this in a compact configuration.

Figure 29:
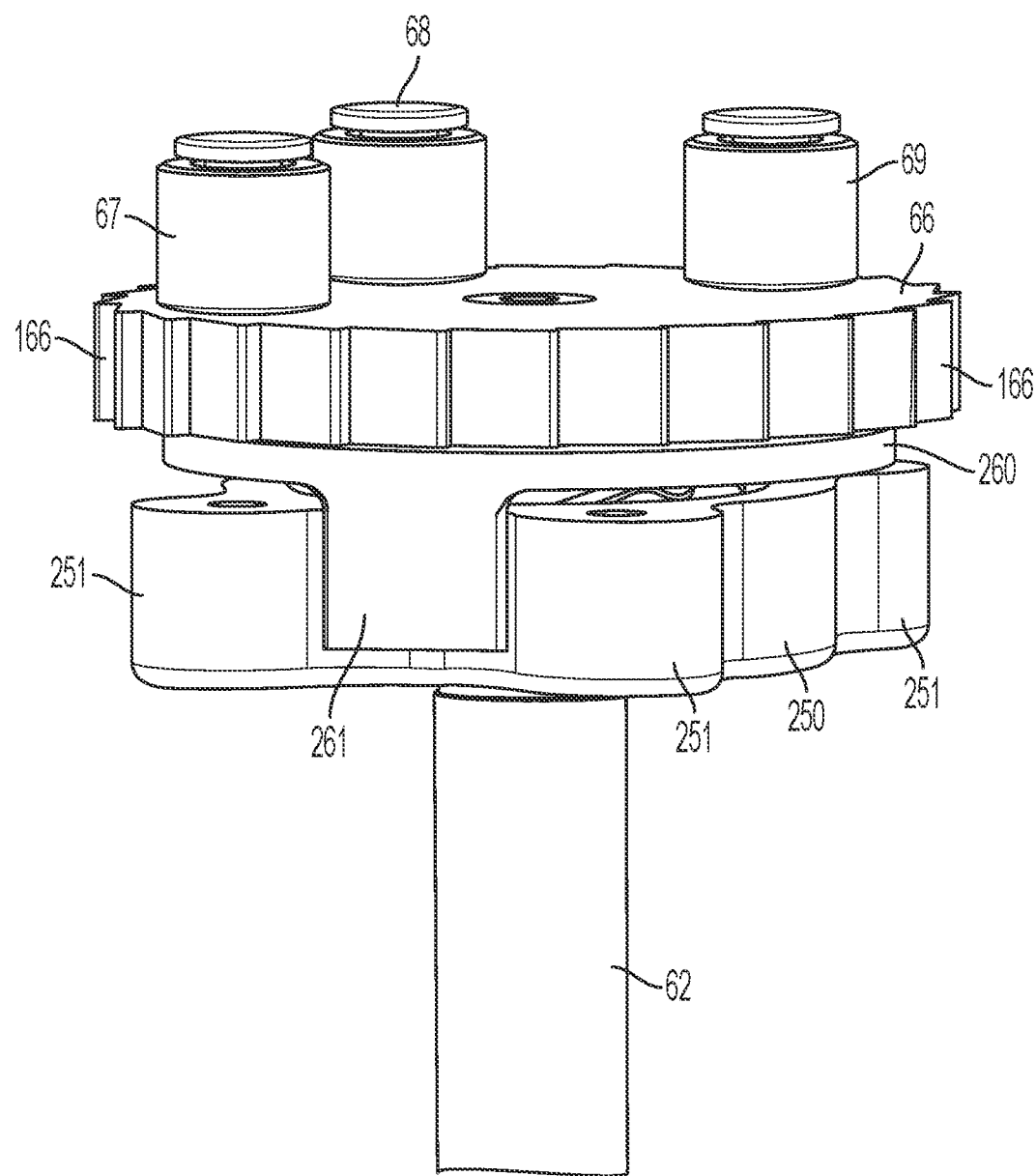
FIG. 29 is a perspective view of an anti-backdrive mechanism according to an exemplary embodiment of the present application.

FIG. 29 is a perspective view of the drive shaft 62, holder 250, locking piece 260 and drive wheel 66. In addition to the first and second drive pins 66 and 67, the drive wheel 66 shown in FIGS. 29-41 includes a third drive pin 69. Although shown with a three drive pin design, the third pin may be removed so that it operates with only two pins. Additionally, the drive wheel 66 may have a single pin design.

If a third drive pin 69 is used, a third tab can be added to the carriage 70 to work with the third pin 69 and the spring drive engine will work in a similar manner but with three pins. Similarly, only a single pin can be used in which case there would be only a single tab on the carriage 70.

The locking piece 260 is secured rotationally by the holder 250. The locking piece 260 pushes down a wave spring 281 (FIG. 35) to allow the drive wheel 66 to turn in the correct direction and gets pushed up on by the wave spring 281 to lock the drive wheel 66 and prevent backdrive.

The holder 250 is secured to the support structure 78 of the driver 10 by a plurality of screws, such as four screws. The wave spring 281 sits inside the top part of the holder 250. The locking piece 260 has a pair of legs 261 that lock onto the holder 250. This locking system allows the locking piece 260 to only move along the axis of the drive shaft 62.

In other embodiments the wave spring 281 or other biasing member may be secured in a different manner. For example, if the holder 250 is outside of the frame or support structure 78, as in FIG. 7, then the wave spring 281 may be secured by the support structure 78 or other component. Similarly, the locking piece 260 may be restrained from rotational movement by other parts or methods other than meshing with the holder 250. For example, again referring to FIG. 7 in which the holder 250 is outside of the frame 78, the legs 261 of the locking piece 260 may be held directly by the frame 78. For example, there may be cut-outs for the legs 261 and the cut-outs may restrain rotational motion of the legs 261 and therefore the locking piece 260. In other embodiments, the locking piece 260 may have parts other than legs 261 for restraining rotational movement.

The drive wheel 66 is connected to the drive shaft 62 which is held in place by a bearing 55 which is contained by the bearing holder 250 that is attached to the support structure 78. As the drive shaft 62 rotates it turns the drive wheel 66. Indents 81 (FIGS. 32 and 33) on the drive wheel 66 travel over ramps 85 (FIG. 38) (locking keys) on the locking piece 260. This upward force caused by the wave spring 281 causes the locking piece 260 to travel up as the indents 81 align with the ramps 85 and down as they rotate apart. When the drive wheel 66 tries to rotate backwards, it is stopped when the side faces of the ramps contact the side faces of the indents 81.

In some embodiments, the holder 250 may be used to hold a bearing. For example, as shown in FIG. 7, a bearing 55 is held inside the holder 250.

Additionally, the holder may be located outside or inside the frame 78. For example, as shown in FIG. 7, the holder 250 is below the frame 78, whereas in FIG. 30 the holder 250 is located inside the frame 78.

FIG. 29 is a perspective view of the anti-backdrive mechanism 700. As shown, the drive shaft 62 feeds into the mechanism 700.

Figure 30:
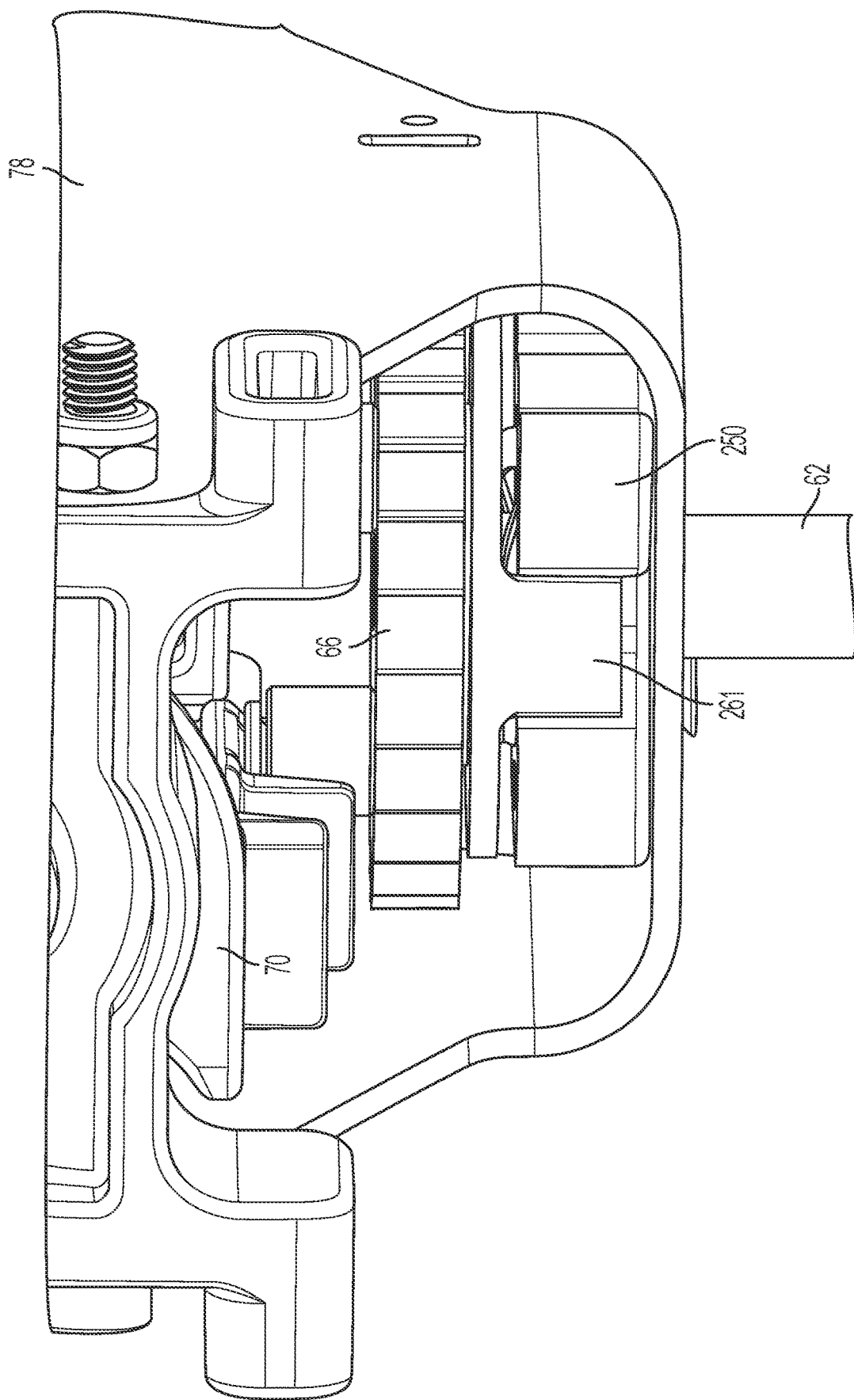
FIG. 30 is a perspective view of an anti-backdrive mechanism and frame according to an exemplary embodiment of the present application.

FIG. 30 is a perspective view of a the anti-backdrive mechanism with a portion of the support structure 78.

Figure 31:
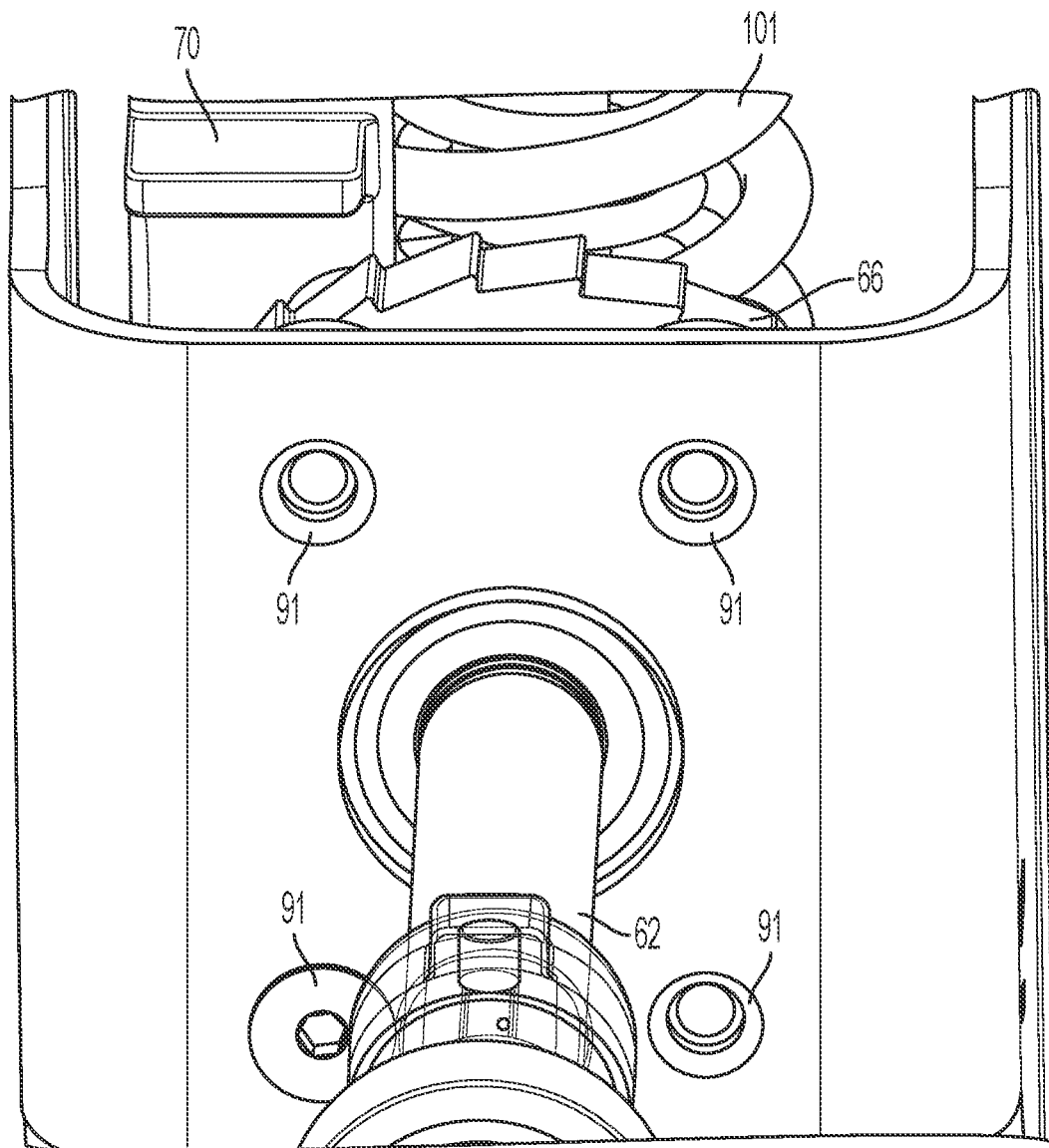
FIG. 31 is a bottom perspective view of an anti-backdrive mechanism and frame according to an exemplary embodiment of the present application.

FIG. 31 is a bottom perspective view. As shown in FIG. 31, there are four screw holes 91 in the support structure 78 through which screws can be driven to secure the holder 250.

Figure 33:
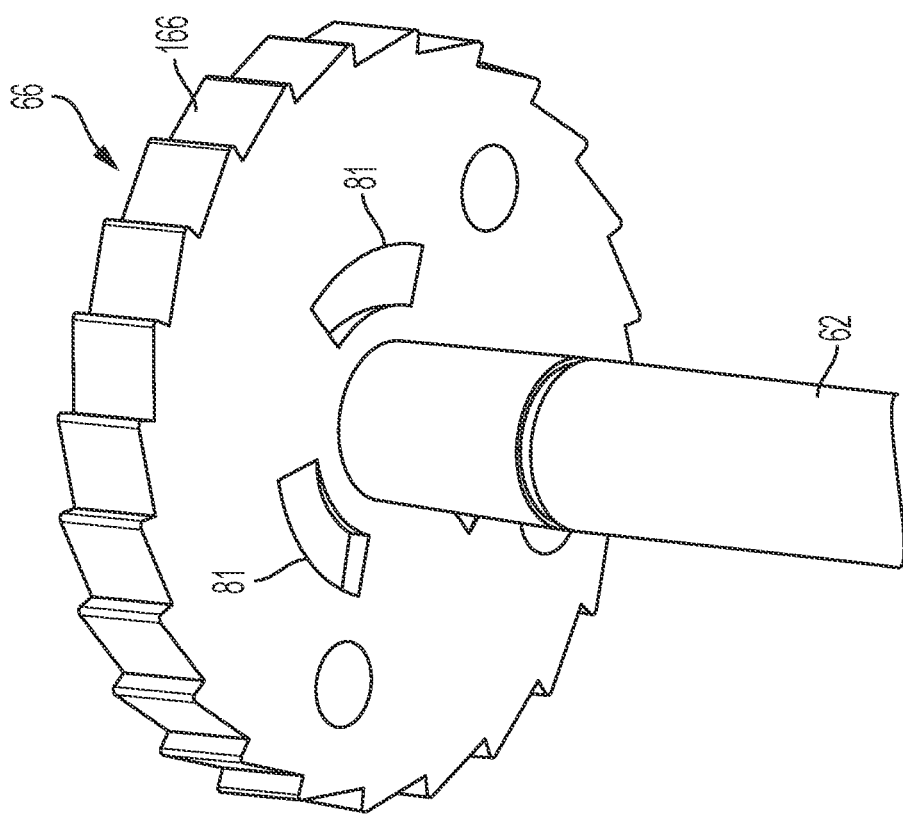
FIG. 33 is a bottom perspective view of selected components of an anti-backdrive mechanism according to an exemplary embodiment of the present application.
Figure 32:
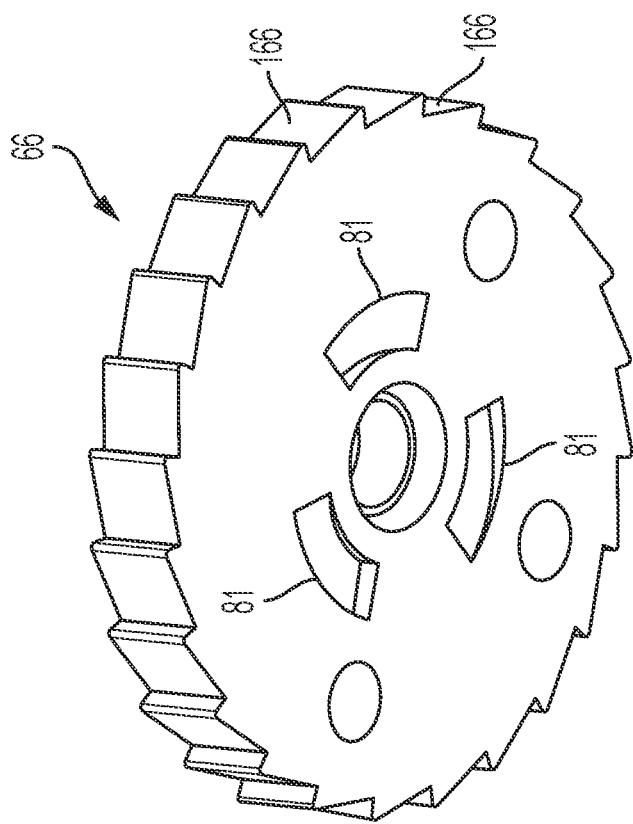
FIG. 32 is a bottom perspective view of selected components of an anti-backdrive mechanism according to an exemplary embodiment of the present application.

FIGS. 32-41 illustrate various assemblies with one or multiple components. FIG. 32 illustrates a perspective view of the drive wheel 66 and FIG. 33 illustrates a similar view with the addition of the drive shaft 62 connected to the drive wheel. The drive shaft 62 can be screwed into the drive wheel 66 or they may be connected by other means such as welding, frictional fit or other means. In any event, the drive wheel 66 is driven by the drive shaft 62 when the drive shaft 62 rotates.

As shown in FIGS. 32 and 33, a bottom side of the drive wheel 66 includes three indents 81. The indents 81 provide a gradually indented slope. In some embodiments, there may be more or fewer than three indents 81. Additionally, it can be seen that the drive wheel 66 has a ratcheted outer surface with a number of uniformly spaced teeth 166.

Figure 35:
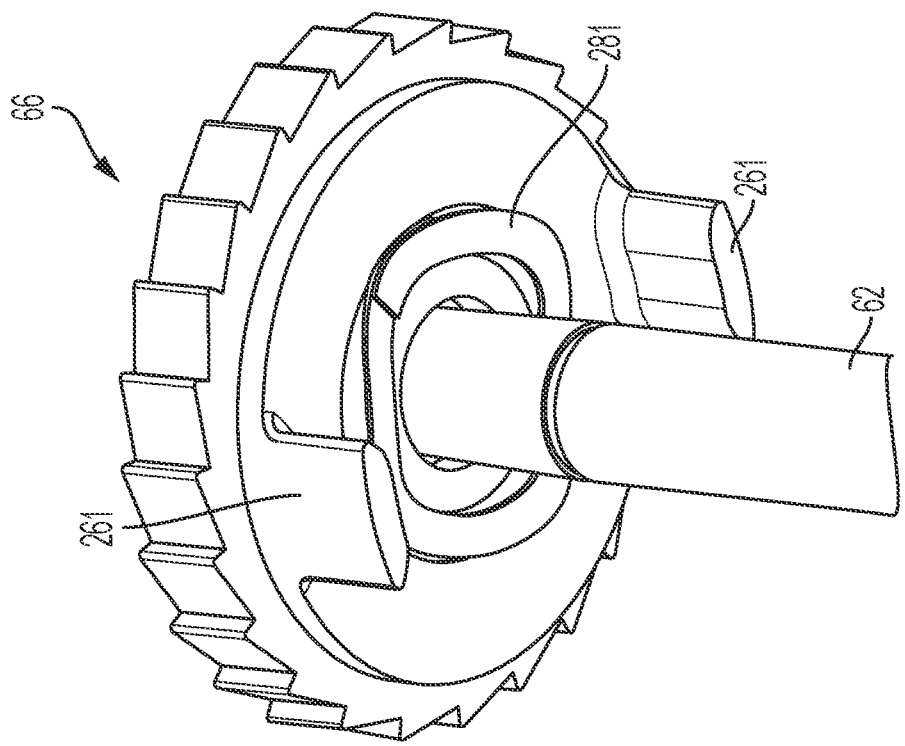
FIG. 35 is a bottom perspective view of selected components of an anti-backdrive mechanism according to an exemplary embodiment of the present application.
Figure 34:
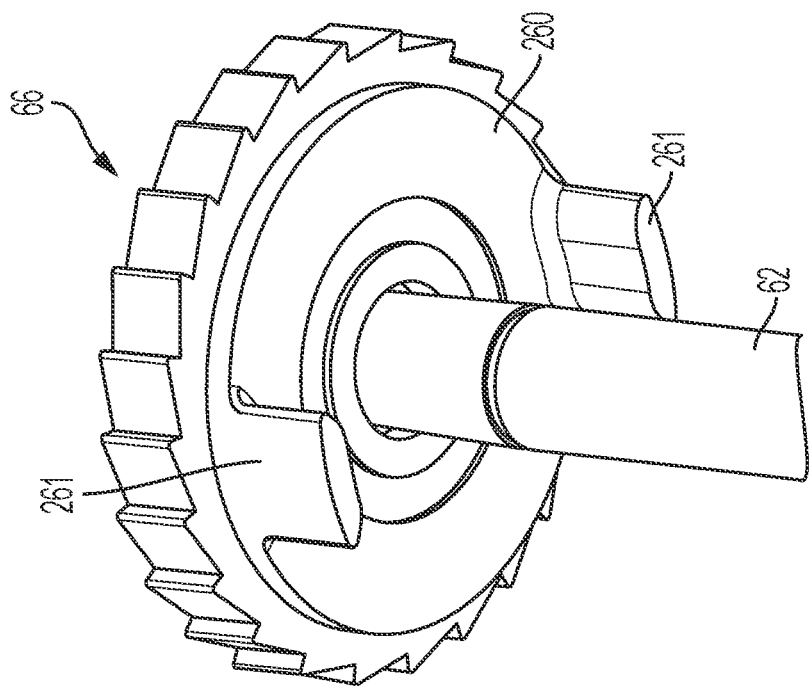
FIG. 34 is a bottom perspective view of selected components of an anti-backdrive mechanism according to an exemplary embodiment of the present application.

FIG. 34 is a similar view to FIGS. 32 and 33, but also includes the locking piece 260 with legs 261. FIG. 35 additionally includes the wave spring 281. Although the exemplary embodiment utilizes a wave spring 281, other biasing members may be utilized to bias the locking member 260 away from the holder 250 and towards the drive wheel 66. The biasing member, for example, could be a rubber member or a different type of spring.

Figure 36:
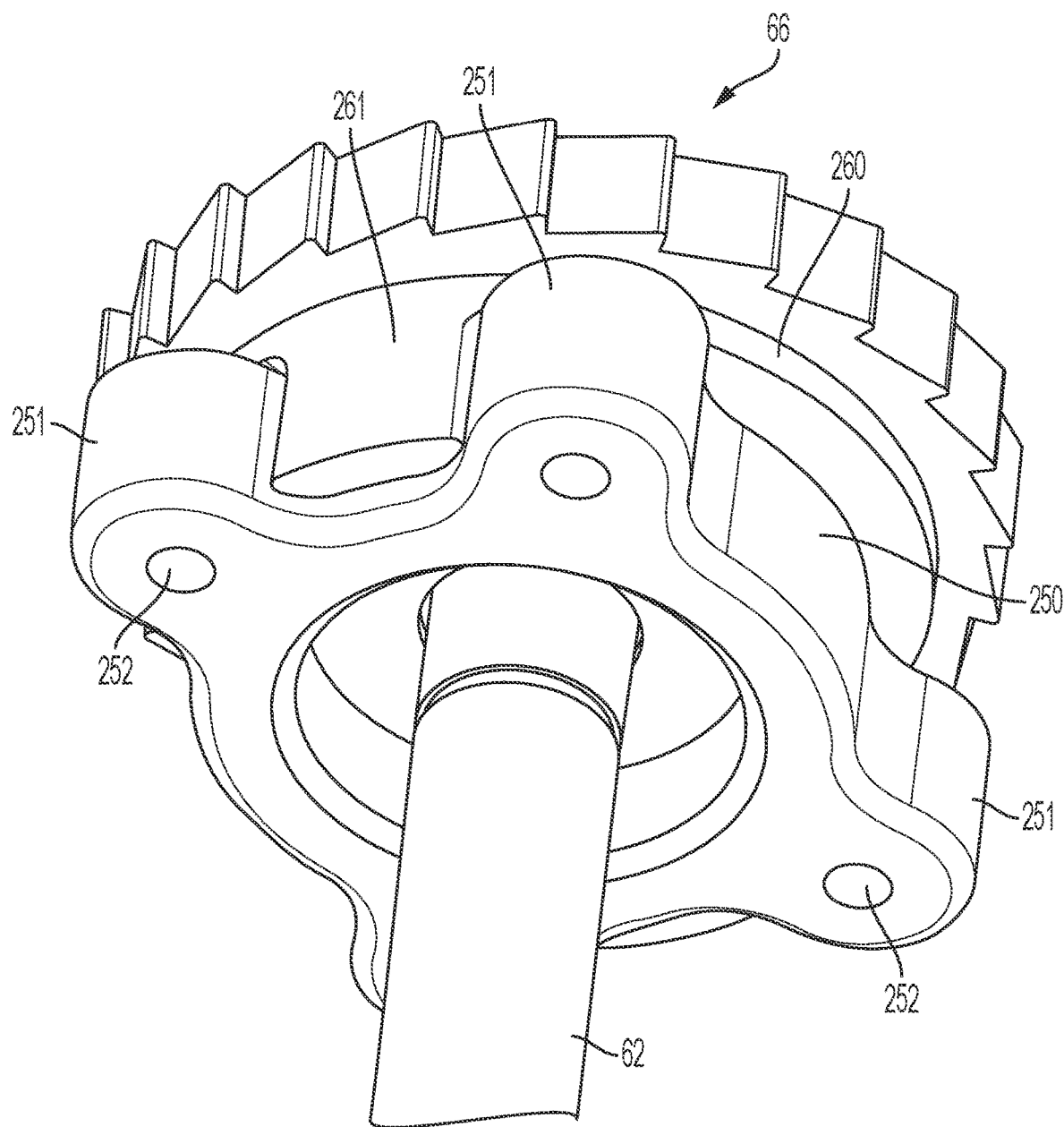
FIG. 36 is a bottom perspective view of selected components of an anti-backdrive mechanism according to an exemplary embodiment of the present application.

FIG. 36 is likewise a bottom perspective view similar to 32-35. In comparison to FIG. 35, the illustration of FIG. 36 further adds the holder 250, which includes four projections or nubs 251. The legs 261 of the locking member 260 sit between the nubs 251 to prevent relative rotation of the locking member 260 with respect to the holder 250. Additionally, each of the nubs has a screw hole 252. The screw holes 252 are aligned with the holes 91 in support structure 78 shown in FIG. 31 so that the holder 250 can be secured to the support structure 78. The holder 250 can also be secured by other means, such as, for example, by other types fasteners. As will be appreciated, the locking member 260 is held between the holder 250 and the drive wheel 66. The locking member 260 can translate axially in a vertical direction against the force of the wave spring 281.

Figure 38:
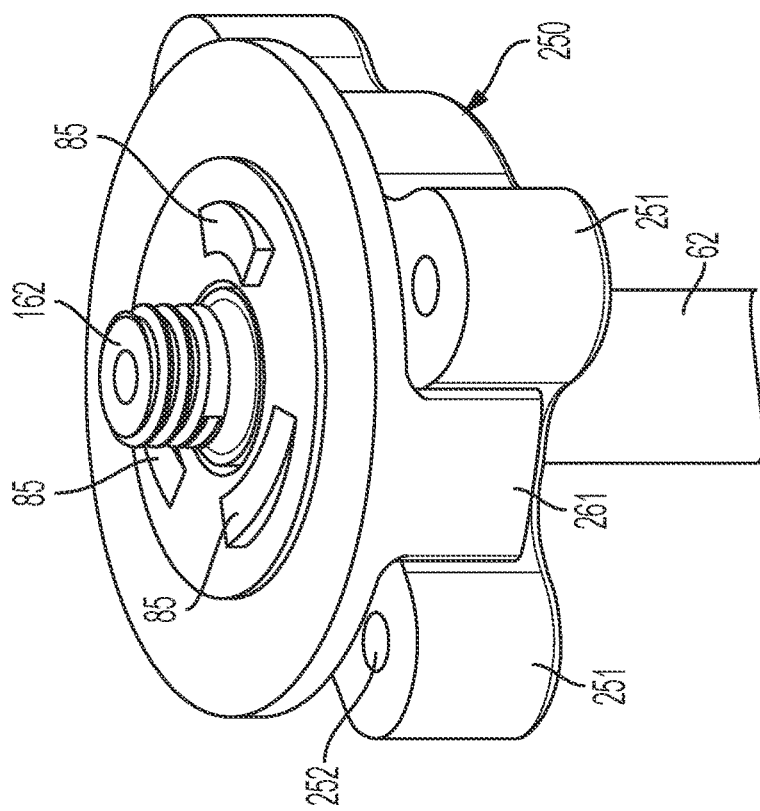
FIG. 38 is a top perspective view of selected components of an anti-backdrive mechanism according to an exemplary embodiment of the present application.
Figure 37:
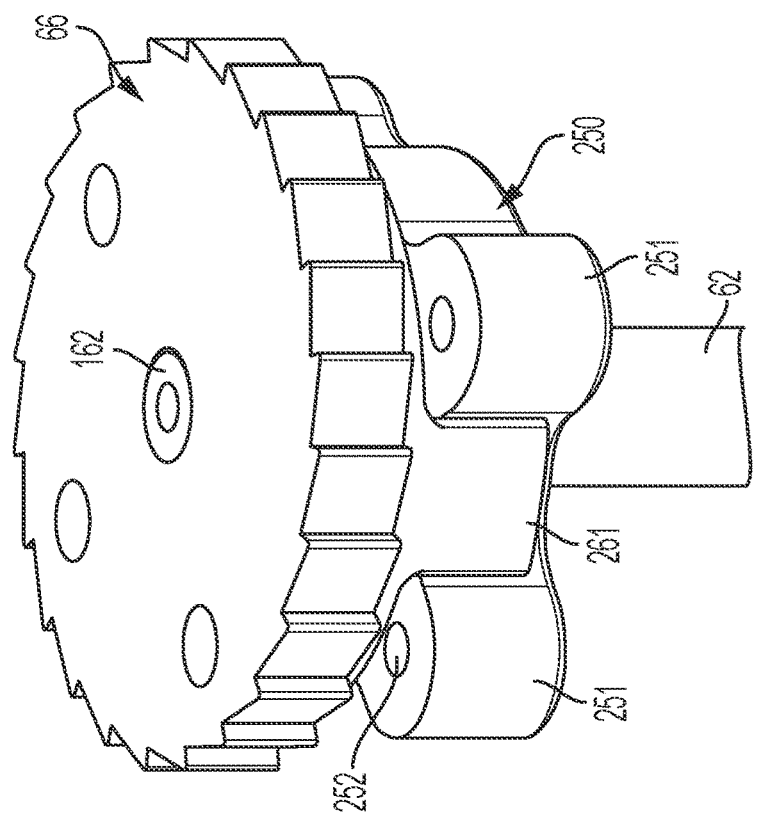
FIG. 37 is a top perspective view of selected components of an anti-backdrive mechanism according to an exemplary embodiment of the present application.
Figure 39:
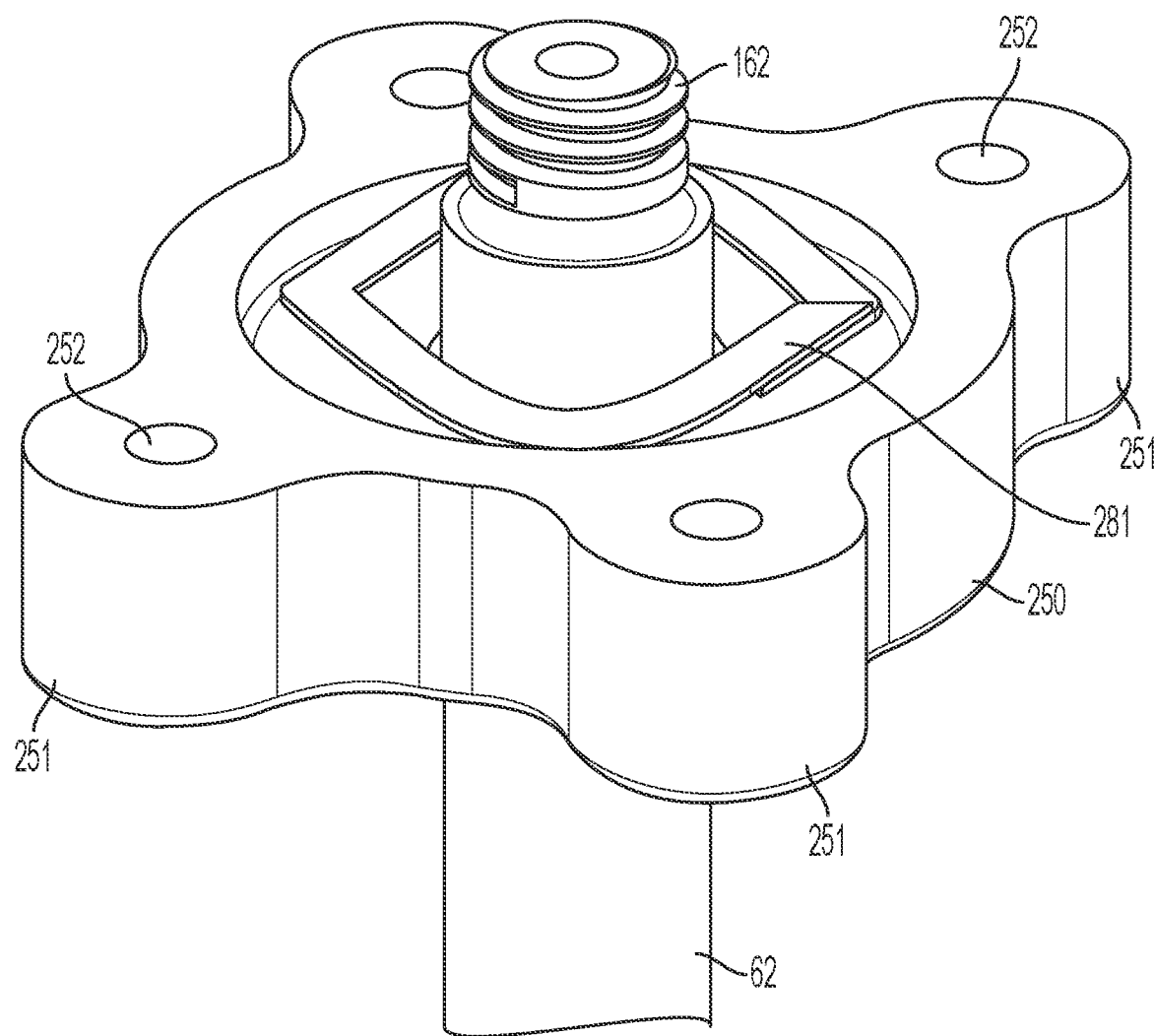
FIG. 39 is a top perspective view of selected components of an anti-backdrive mechanism according to an exemplary embodiment of the present application.

FIGS. 37 through 39 are top perspective views of portions of the assembly. FIG. 37 illustrates the assembly with the drive shaft 62, holder 250, locking member 260 and drive wheel 66. The locations for the pins are shown, but not the pins themselves. FIG. 38 is similar to FIG. 37, but does not include the drive wheel 66. As shown in FIGS. 37 and 38, the drive shaft 62 has a top end 162 that is threaded and onto which the drive wheel 66 is secured by screwing the drive wheel 66 onto the top end 162 of the shaft. The drive wheel 66 may be secured to the top end 162 of the shaft 62 by other means. For example, there may be a frictional fit, a lock and key, a combination of a lock and key and frictional fit, meshing splines, fasteners, adhesives, welding or a combination of these means of connection.

FIG. 38 illustrates the previously discussed ramps 85. The ramps 85 may also be referred to as locks, locking projections or locking members. The ramps 85 project upwardly from a top surface of the locking member 260. The ramps 85 oppose the previously discussed indents 81 and cooperate with the indents 81 to prevent backdrive, as previously discussed. The shape and size of the ramps 85 and indents 81 are complementary with the ramps 85 fitting into the indents 81. Other locking structures may be used such as rectangular tabs rather than ramps and corresponding indents.

FIG. 39 is a similar view as FIG. 38, but does not include the locking member 260. Accordingly, the wave spring 281 is visible.

Figure 40:
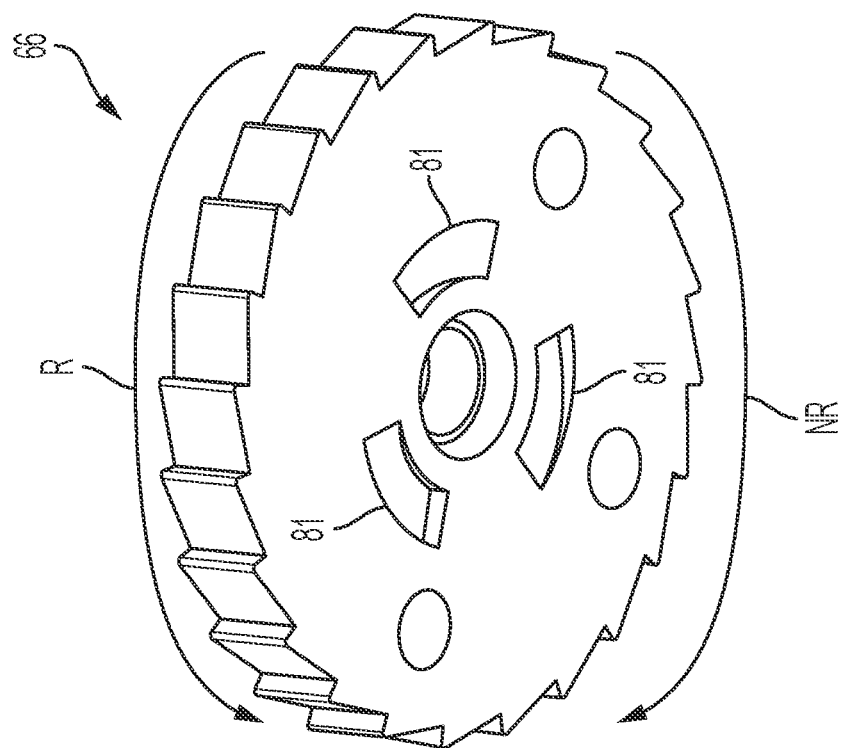
FIG. 40 is a bottom perspective view of selected components of an anti-backdrive mechanism according to an exemplary embodiment of the present application.

FIG. 40 illustrates a bottom perspective view of the drive wheel 66. The arrow R (counter-clockwise) illustrates the direction in which the drive wheel 66 can rotate. The arrow NR illustrates the direction (clockwise) in which the drive wheel 66 cannot rotate.

Figure 41:
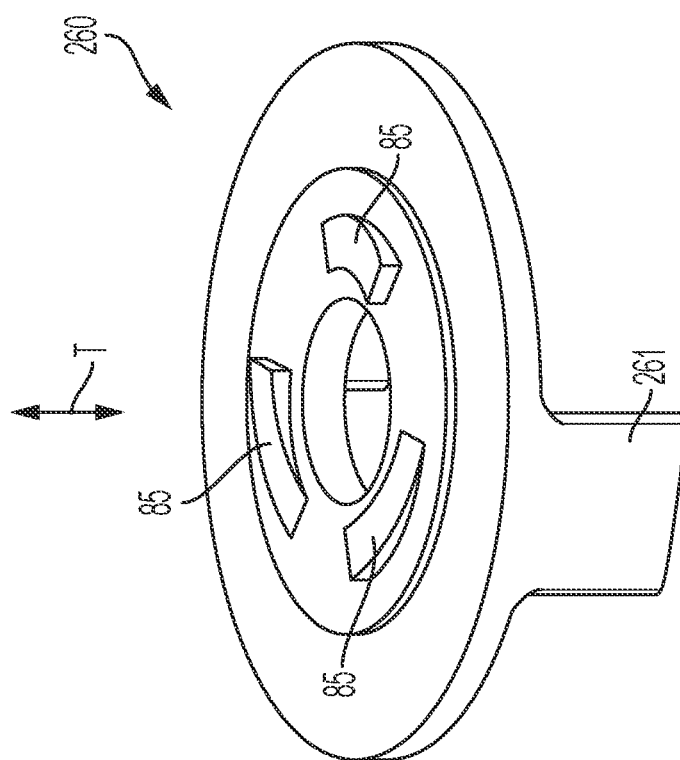
FIG. 41 is a top perspective view of selected components of an anti-backdrive mechanism according to an exemplary embodiment of the present application.

FIG. 41 illustrates a top perspective view of the locking member 260 along with the vertical translating direction T in which the locking member 260 can translate.

The anti-backdrive system of FIGS. 29-41 is used in the exemplary embodiment of the driver 10 of the present application, but may also be applied to other power tools, including power tool drivers.

Figure 42:
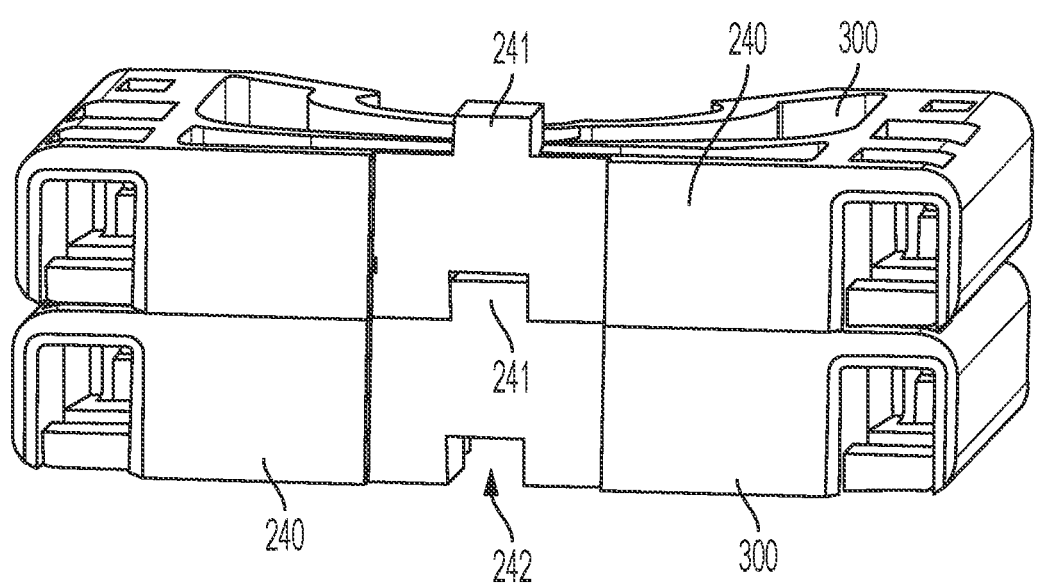
FIG. 42 is a rear perspective view of a pair of pipe clamps with a collating feature according to an exemplary embodiment of the present application.
Figure 43:
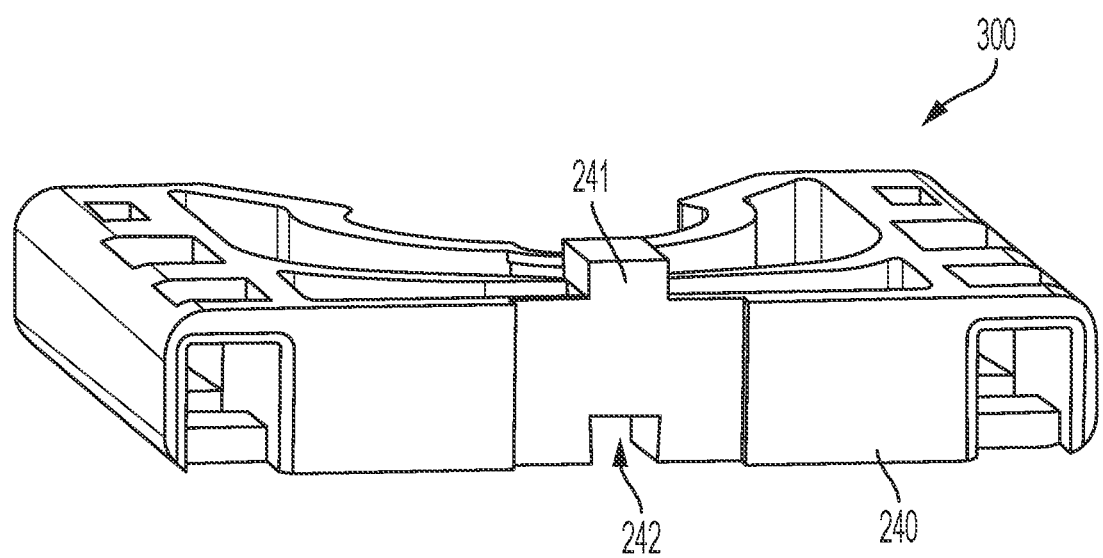
FIG. 43 is a rear perspective view of a pipe clamp with a collating feature according to an exemplary embodiment of the present application.
Figure 44:
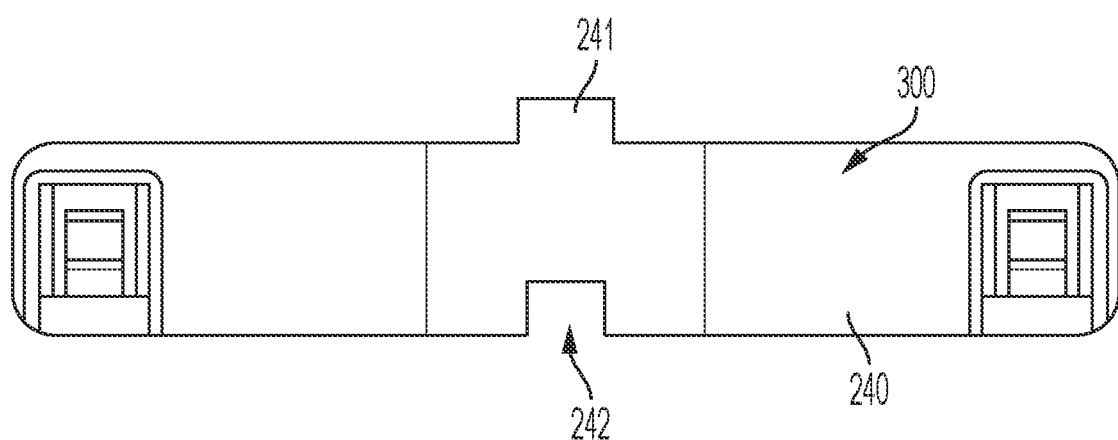
FIG. 44 is a rear plan view of a pipe clamp with a collating feature according to an exemplary embodiment of the present application.
Figure 45:
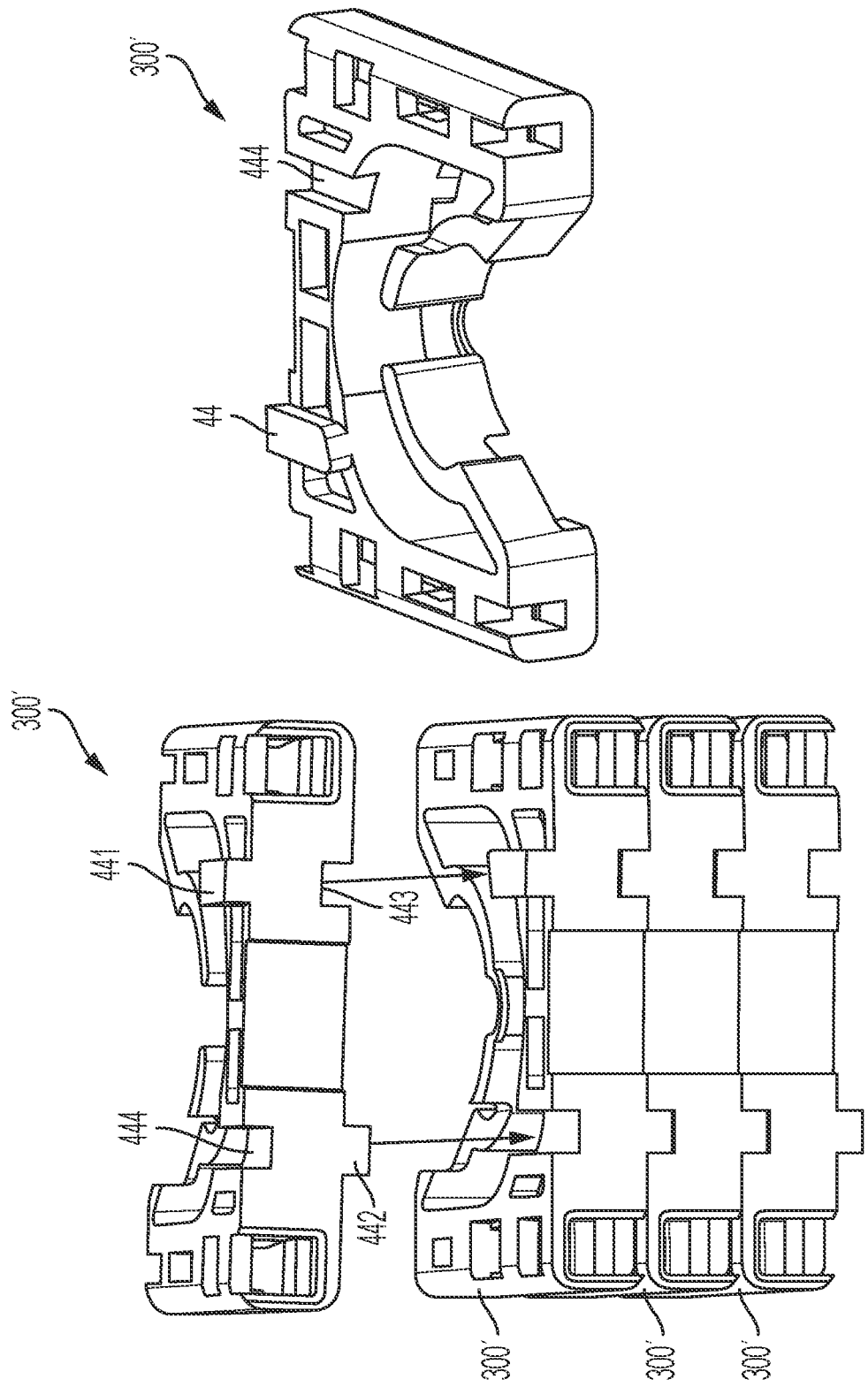
FIG. 45 is a rear perspective view of pipe clamps with a collating feature according to an exemplary embodiment of the present application.

FIGS. 42-45 illustrate collation for the pipe clamps. FIGS. 42-44 illustrate a first embodiment and FIG. 45 illustrates a second embodiment. Although the collation will be described with respect to the pipe clamp 300, the collation features can be used on any of the pipe clamps discussed in this application.

The pipe clamps must be loaded into the driver 10, particularly into the magazine 200 of the driver 10 which feeds them to the nose for driving. For convenience, the pipe clamps may be collated into sticks of multiple pipe clamps, for example, ten to twelve pipe clamps. The pipe clamps are held together rigidly enough for handling, while being able to break apart during firing. That is, when the driver blade 110 drives a pipe clamp, the pipe clamp must separate from the collated stick.

According to the exemplary embodiments, the pipe clamps are held together by an interference fit between features that are part of the plastic clamp portion of the pipe clamps. In particular, there is at least one rib and one pocket on each clamp. The direction of the rib and pocket are parallel to the drive direction (i.e., the direction in which the pipe clamp is driven into a workpiece). This allows the top pipe clamp in a collated pipe clamp stick to slide off during the driving.

An end view of a pipe clamp 300 with a mechanical collation feature is shown in FIGS. 42-44. As shown in FIGS. 42-44, the pipe clamp 300 includes a rear surface 240. At an upper end of the rear surface 240, it includes a rib 241. At a lower end of the rear surface 240, there is a pocket 242. Accordingly, as shown in FIG. 42, the pipe clamps 300 may be assembled together. In particular, the rib 241 of one pipe clamp may be fit, such as by press fit, into a pocket 242 of another pipe clamp 300. FIG. 42 is a rear perspective view of an assembly of two pipe clamps 300 with the collation feature. FIG. 43 is a rear perspective view of a single pipe clamp 300 with the collation feature and FIG. 44 is a rear plan view of a single pipe clamp 300 with the collation feature. The ribs 241 and pockets 242 are sized such that the ribs 241 and pockets 242 form an interference fit so that the pipe clamps 300 hold together when not under an undue load, but separate when driven by the driver 10.

FIG. 45 illustrates another exemplary embodiment of a pipe clamp collation feature. In this case, each pipe clamp 300' includes two ribs and two pockets. In particular each pipe clamp 300' includes an upward rib 441 and a downward rib 442. Each pipe clamp 300' also includes an upward pocket 443 and a downward pocket 444. The upward rib 441 of one pipe clamp 300' fits into the downward pocket 443 of an adjacent pipe clamp 300'. Similarly, the downward rib 442 of one pipe clamp 300' fits into the upward pocket 444 of an adjacent pipe clamp 300'. As with the previous ribs and pockets, the pockets and ribs of this exemplary embodiment are configured to press-fit into one another such that the pipe clamps 300' hold together when not under an undue load, but separate when driven by the driver 10. The pipe clamp 300' is similar to the pipe clamp 300 except for the inclusion of two ribs and pocket and the inclusion of a break-away portion. The collation shown in FIG. 19 includes two ribs and pockets, as per the exemplary embodiment of FIG. 45.

Either exemplary embodiment of the collation features may be included on any of the pipe clamps discussed in this application.

Figure 46:
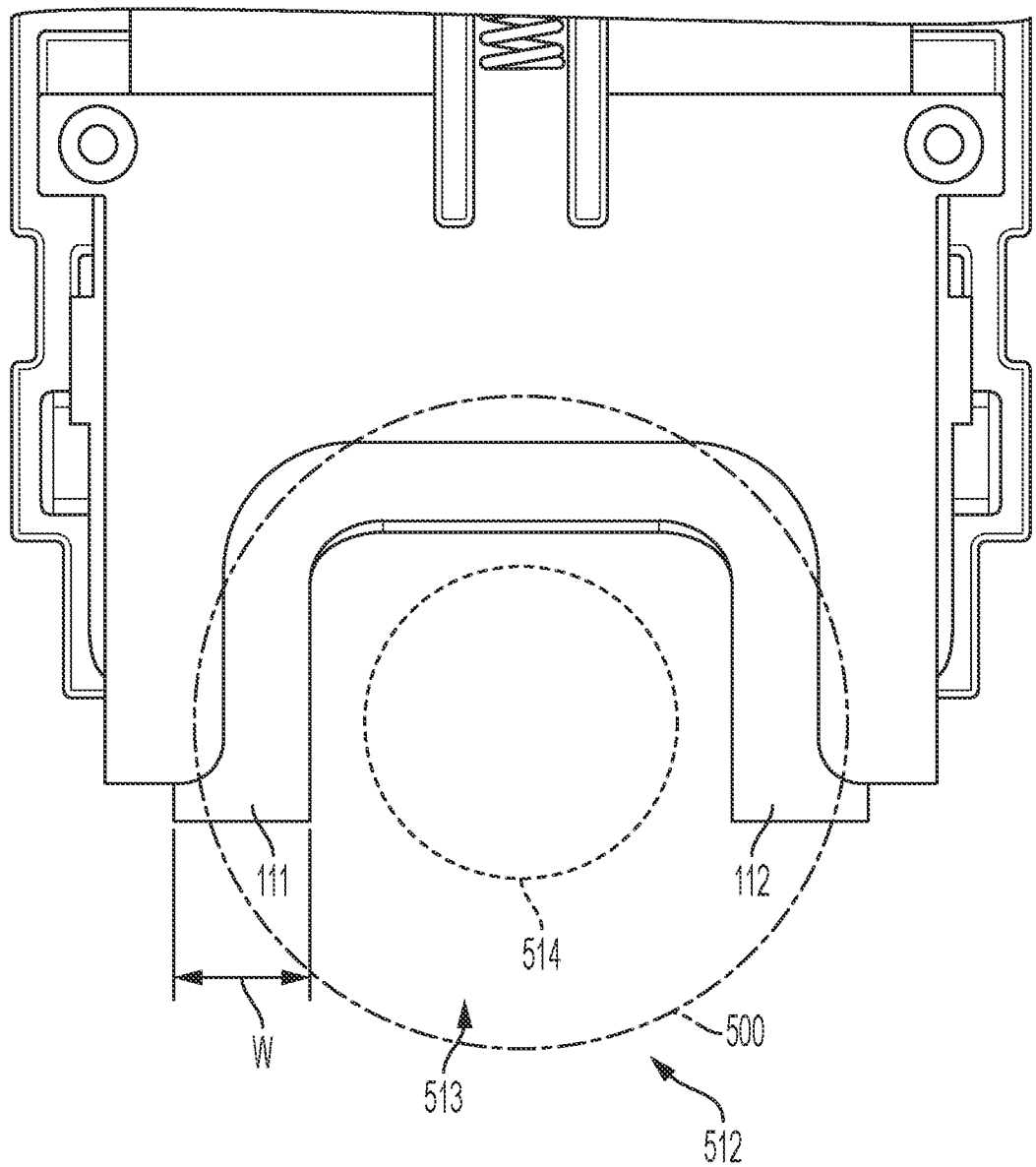
FIG. 46 is a top view of an exemplary embodiment of a driver blade with wide driving projections and a foam over plastic pipe.

As shown in FIG. 46, in some embodiments, projections 111 and 112 of the driver blade 110 may be relatively wider than the relative width shown in FIG. 10. FIG. 46 illustrates a pipe 512 with a foam portion 513 around an inner pipe portion 514. The inner pipe portion 514 may be hollow and made of plastic, such as PVC pipe. The inner pipe portion 514 may also be made of other materials such as various plastics or metals such as copper. The inner pipe 514 is wrapped with a foam portion 513. The foam may serve as insulation. As shown in FIG. 46, having the projections 111 and 112 have a relatively larger width allows them to cut through the foam portion 513.

In the various embodiments, the projections 111 and 112 may have a width W that is 1 mm or greater; 2 mm or greater; 3 mm or greater; 4 mm or greater; 5 mm or greater; 6 mm or greater; 7 mm or greater; 8 mm or greater; 9 mm or greater; or 10 mm or greater; 15 mm or greater; 20 mm or greater; or 25 mm or greater.

Figure 47:
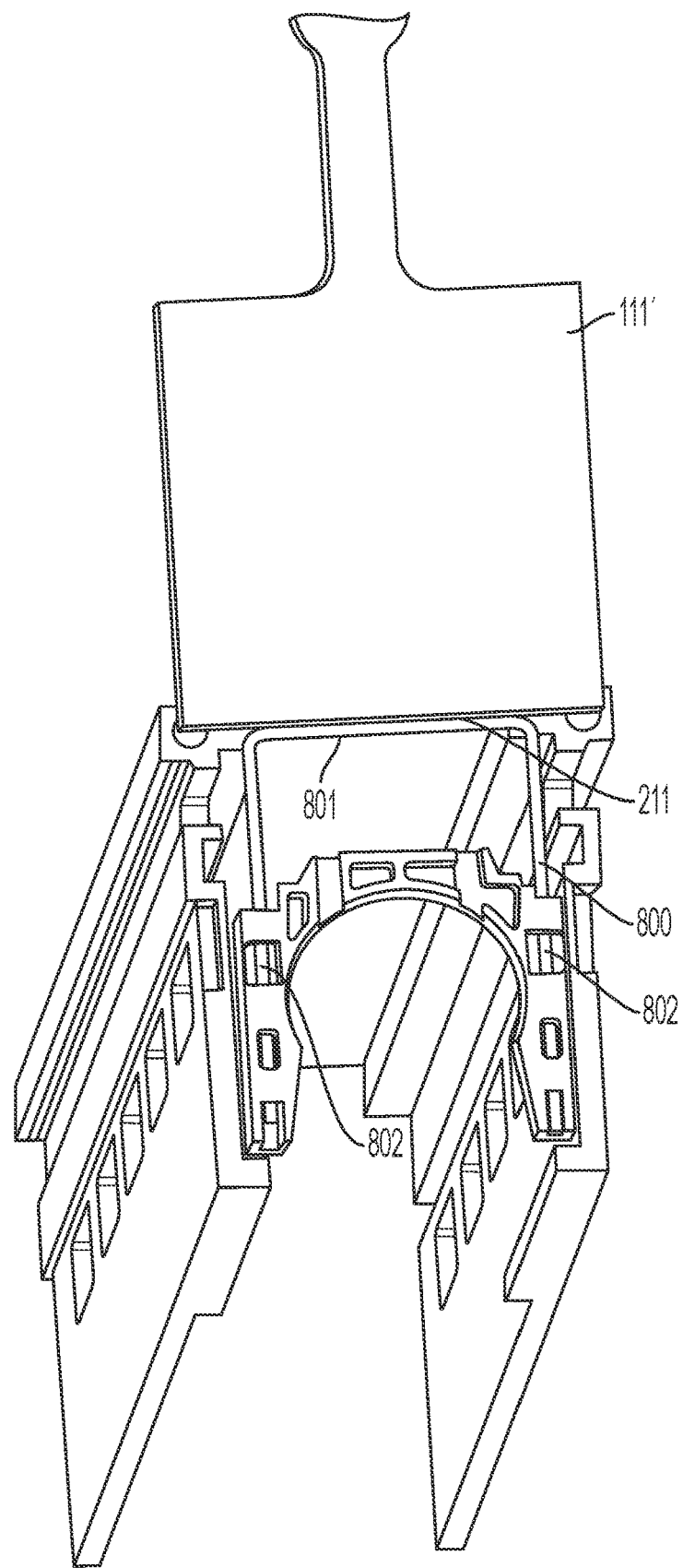
FIG. 47 is a top perspective view of an exemplary embodiment of a flat front driver blade and a pipe clamp including a staple.

As shown in FIG. 47, according to another exemplary embodiment, the driver blade 111' may be a solid flat driver blade 111' without two separate projections. The driver blade 111' has a continuous front surface 211 that allows it to be used on staples of different widths, for example, staple 800 shown in FIG. 47. Staple 800 has a crown 801 and legs 802. The front surface 211 can be considered as having the dimension E as shown and described with respect to FIG. 10 and the various dimensions of E described in this application. The driver blade 111' should also otherwise be considered as having the same features and dimensions as the driver blade 111 apart from the distinction regarding the continuous front surface 211 rather than the separate projections 111 and 112.

As shown in FIG. 47, rather than having a pair of nails 301, the various pipe clamps of the present application may instead use a staple, such as staple 800. In particular, the legs 802 of the staple 800 are inserted into the receiving portions at either end of the pipe clamp bodies rather than the two discreet nails 301. The crown 801 of the staple may be spaced from the pipe clamp bodies as shown in FIG. 47 or may be adjacent to or in contact with the pipe clamps. In some embodiments, a groove or other feature may be included to the pipe clamps to accept the crown 801. The crown 801 may snap fit into the groove. In other embodiments, the staple may be snap fit at other portions of the pipe clamp. In any event, the staple may be secured to the pipe clamp by means such as a snap fit, interference fit, frictional fit or other means.

The exemplary embodiment pipe clamp 320 illustrated by itself in FIG. 17 is shown in the assembly of FIG. 47, but any of the various other pipe clamp embodiments may be used with a staple such as staple 800 and a flat driver blade 111' rather than driver blade 111. Additionally, it should be noted that flat driver blade 111' may be used in place of driver blade 111 regardless of whether the pipe clamp being driven is using nails, a staple or another fastener.

Although the present technology has been described in detail for the purpose of illustration based on what is currently considered to be the most practical and preferred embodiments, it is to be understood that such detail is solely for that purpose and that the technology is not limited to the disclosed embodiments, but, on the contrary, is intended to cover modifications and equivalent arrangements that are within the spirit and scope of the appended claims. For example, it is to be understood that the present technology contemplates that, to the extent possible, one or more features of any embodiment can be combined with one or more features of any other embodiment.

Additionally, while the exemplary embodiment is described with respect to a fastening tool, the methods and configurations may also apply to or encompass other power tools.

What is claimed is:

1. An anti-backdrive system for a power tool, comprising:
   a drive shaft;
   a holder having a plurality of nubs;
   a locking member having at least one leg portion projecting from the perimeter thereof and disposed between at least one pair of nubs to secure the holder in the power tool in a non-rotatable manner;
   a drive wheel connected to the drive shaft;
   wherein the locking member is axially movable towards and away from the drive wheel.

2. The anti-backdrive system of claim 1, wherein the drive wheel includes at least one projecting pin.

3. The anti-backdrive system of claim 1, wherein the drive wheel has a first lock;
   wherein the locking member has a second lock; and
   wherein the first lock and second lock cooperate to prevent backdrive of the drive wheel.

4. The anti-backdrive system of claim 3, wherein the first lock is an indent.

5. The anti-backdrive system of claim 4, wherein the second lock is a ramp.

6. The anti-backdrive system of claim 1, further comprising a biasing member which biases the locking member towards the drive wheel.

7. The anti-backdrive system of claim 6, wherein the biasing member is a spring.

8. The anti-backdrive system of claim 7, wherein the biasing member is a wave spring.

* * * * *